United States Patent
Park et al.

(10) Patent No.: US 8,619,354 B2
(45) Date of Patent: Dec. 31, 2013

(54) HIGH SPEED OPTICAL SHUTTER, METHOD OF OPERATING THE SAME AND APPARATUS INCLUDING THE SAME

(75) Inventors: Yong-hwa Park, Yongin-si (KR); Alexander Gorelov, Moscow (RU); Stanislav Shtykov, Moscow (RU); Alexander Shirakov, Moscow (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 547 days.

(21) Appl. No.: 12/726,162

(22) Filed: Mar. 17, 2010

(65) Prior Publication Data
US 2011/0074659 A1    Mar. 31, 2011

(30) Foreign Application Priority Data
Sep. 25, 2009  (KR) .......................... 10-2009-0091143

(51) Int. Cl.
    *G02F 1/29*  (2006.01)
(52) U.S. Cl.
    USPC .......................................................... 359/320
(58) Field of Classification Search
    USPC .......................................................... 359/320
    See application file for complete search history.

(56) References Cited

U.S. PATENT DOCUMENTS

| | | | |
|---|---|---|---|
| 5,159,351 A * | 10/1992 | Hotomi et al. | 347/260 |
| 5,467,146 A * | 11/1995 | Huang et al. | 348/743 |
| 6,100,517 A | 8/2000 | Yahav et al. | |
| 6,331,911 B1 | 12/2001 | Manassen et al. | |
| 6,794,628 B2 | 9/2004 | Yahav et al. | |
| 7,016,519 B1 | 3/2006 | Nakamura et al. | |
| 7,095,487 B2 | 8/2006 | Gonzalez-Banos et al. | |
| 7,139,042 B2 | 11/2006 | Nam et al. | |

FOREIGN PATENT DOCUMENTS

| | | |
|---|---|---|
| JP | 04-296718 A | 10/1992 |
| JP | 6-258672 A | 9/1994 |
| JP | 2005-181717 A | 7/2005 |
| KR | 10-0346373 B1 | 11/2002 |
| KR | 10-2004-0103724 A | 12/2004 |

OTHER PUBLICATIONS

Fujiura et al., KTN Optical Waveguide Technologies with a Large Electro-Optic Effect, NTT Photonics Laboratories, NTT Corporation, Japan, 2005, pp. 69-70.

* cited by examiner

*Primary Examiner* — James Jones
(74) *Attorney, Agent, or Firm* — Sughrue Mion, PLLC

(57) ABSTRACT

A high speed optical shutter, a method of operating the high speed optical shutter, and an optical apparatus including the high speed optical shutter. The optical shutter includes a transparent electro-optical medium in an active solid state having a total internal reflection surface on which an angle of total internal reflection is changed by an external action. The transparent electro-optical medium may be a prism or a prism array whose angle of total internal reflection is changed by the external action. An incident light path changing unit may be further arranged in front of the transparent electro-optical medium. Also, a light path changing unit may be further arranged so as to allow light passing through the electro-optical medium to be perpendicularly incident on an incidence target object.

39 Claims, 26 Drawing Sheets

HIGH SPEED OPTICAL SHUTTER, METHOD OF OPERATING THE SAME AND APPARATUS INCLUDING THE SAME

CROSS-REFERENCE TO RELATED APPLICATIONS

This application claims the benefit of Korean Patent Application No. 10-2009-0091143, filed on Sep. 25, 2009, in the Korean Intellectual Property Office, the disclosure of which is incorporated herein in its entirety by reference.

BACKGROUND

1. Field

Exemplary embodiments consistent with the present disclosure relate to an optical device, and more particularly, to a high speed optical shutter, a method of operating the high speed optical shutter, and an optical apparatus including the high speed optical shutter.

2. Description of the Related Art

An optical shutter for transmitting or blocking an optical image according to a control signal is a main optical module that is widely used in photographing apparatuses including cameras, and a display device including a liquid crystal display (LCD) device.

Recently, research into three-dimensional (3D) cameras or laser radar (LADAR) technology for obtaining distance information of an object is being conducted. In this regard, 3D cameras and the LADAR technology measure a distance between a photographing apparatus and a subject by using time-of-flight (TOF) of light.

A shuttered light pulse (SLP) method from among various TOF methods involves emitting light of a particular wavelength to a subject, shuttering an optical image of the wavelength which is reflected from the subject, obtaining an image via an imaging device, performing a series of processes, and thus obtaining distance information. In order to distinguish between travel times of light according to distances, it is necessary for the SLP method to include a rapid shutter operation having an opening and closing conversion time of less than several nano-seconds (ns). For this, an image intensifier or a semiconductor-based optical shutter has been proposed as a high speed optical image shutter.

However, the image intensifier is an expensive piece of equipment demanding a high voltage and vacuum packaging. Also, although the semiconductor-based optical shutter may overcome disadvantages in operation and structure of the image intensifier, the semiconductor-based optical shutter is manufactured in a GaAs substrate via a semiconductor manufacturing process and has a complicated structure, compared to a photo-diode and a light emitting diode (LED) device used in the related art, and thus it may be relatively difficult to commercialize the semiconductor-based optical shutter with respect to price and manufacturing difficulty.

Meanwhile, an optical modulation device using an electro-optical effect according to the related art includes a Kerr cell or a Pockel cell. The optical modulation device using an electro-optical material has a response speed of several GHz, and thus has been used in waveguide in high speed optical communication.

In the optical modulation device, a polarization characteristic of a nonlinear crystal formed of lithium niobate (LiNbO3) or the like is changed according to a given electric field. That is, the optical modulation device has a shutter function so as to transmit or block a polarized incident light by controlling an angle of polarization by using an external electric field.

SUMMARY

Provided are methods and apparatuses for an optical shutter capable of performing a high speed shuttering operation.

Provided are methods of operating the optical shutter.

Provided are methods and apparatuses for an optical apparatus including the optical shutter.

Additional aspects will be set forth in part in the description which follows and, in part, will be apparent from the description, or may be learned by practice of the presented exemplary embodiments.

According to an aspect of an exemplary embodiment, an optical shutter includes an electro-optical medium being transparent and in an active solid state, and having a total internal reflection surface at which an angle of total internal reflection is changed by an external action.

The optical shutter may further include a light path changing unit for allowing light passing through the electro-optical medium to be perpendicularly incident on an incidence target object.

The optical shutter may further include an incident light path changing unit arranged in front of the electro-optical medium.

Each of the electro-optical medium and the light path changing unit may include a prism or a prism array.

The prism of the electro-optical medium and the prism of the light path changing unit may have same shapes, and may be arranged to be symmetrical with each other.

The prism array of the electro-optical medium and the prism array of the light path changing unit may include a plurality of microprisms, respectively, and the prism array of the electro-optical medium and the prism array of the light path changing unit may be arranged whereby a cross-section of each of the plurality of microprisms of the electro-optical medium may be symmetrical with a cross-section of each of the plurality of microprisms of the light path changing unit.

A gap having a uniform thickness may exist between the electro-optical medium and the light path changing unit on a travel path of the light. Here, the gap may be filled with an optical medium having a refractive index that is less than air, the prism, or the prism array.

A light absorbing film may be attached on one surface of the prism of the electro-optical medium or on one surface of the prism array of the electro-optical medium, and the one surface may indicate a surface on which totally reflected light is incident thereon.

The optical shutter may further include an incident light path changing unit arranged in front of the electro-optical medium.

The incident light path changing unit may be a lens unit for changing a travel path of incident light entering into the incident light path changing unit so as to allow the incident light to be incident on the electro-optical medium as parallel light.

The electro-optical medium may be a prism or a prism array via which incident light is totally reflected or transmitted by the external action.

A light-incident surface of the prism, or a light-incident surface of a microprism comprised in the prism array may be inclined with respect to incident light.

The prism array may include a plurality of microprisms in a stripe form, or a plurality of annular microprisms.

The external action may indicate an electric field formed by being applied a voltage.

A light absorbing film may be attached on a surface that is not on a travel path of light of the prism or the prism array of the light path changing unit.

The electro-optical medium may be inclined with respect to an incidence target object on which light emitted from the electro-optical medium is incident thereon.

According to another aspect of an exemplary embodiment, a method of operating an optical shutter includes the operations of applying a voltage to the electro-optical medium, and then changing an angle of total internal reflection of the electro-optical medium.

The method may further include the operations of sequentially applying the voltage to the electro-optical medium, and then sequentially changing the angle of total internal reflection of the electro-optical medium.

A waveform of the voltage may be a square-wave or a sinusoidal-wave, and is not limited to the square-wave or the sinusoidal-wave.

The electro-optical medium may be a prism or a prism array.

An incident angle of light incident on the electro-optical medium may be less than a fixed angle of total internal reflection of the electro-optical medium, and may be greater than a minimum angle of total internal reflection formed by being applied the voltage.

An incident angle of light incident on the electro-optical medium may be greater than a fixed angle of total internal reflection of the electro-optical medium, and may be less than a maximum angle of total internal reflection formed by being applied the voltage.

The angle of total internal reflection of the electro-optical medium may be decreased by being applied the voltage.

The angle of total internal reflection of the electro-optical medium may be increased by being applied the voltage.

According to another aspect of an exemplary embodiment, an optical apparatus includes an optical shutter. The optical apparatus may be a distance measuring camera including a three-dimensional (3D) camera, or may be a liquid crystal display (LCD).

In yet another exemplary embodiment, there is an optical apparatus including: a refractive element having one of at least two indices of refraction, the refractive element having one of the at least two indices of refraction when a first input is received and another of the least two indices of refraction when a second input is received; and an image sensor which is operable to receive light refracted and transmitted by the refractive element, wherein the refractive element refracts light toward the image sensor when the first input is received and reflects light away from the image sensor when the second input is received.

In such an optical apparatus the refractive element includes a light input surface and a light output surface, and one of the light input surface and the light output surface of the refractive element is inclined and not perpendicular with respect to the light received by the refractive element.

BRIEF DESCRIPTION OF THE DRAWINGS

These and/or other aspects will become apparent and more readily appreciated from the following description of the exemplary embodiments, taken in conjunction with the accompanying drawings of which.

DETAILED DESCRIPTION

Figure 1:
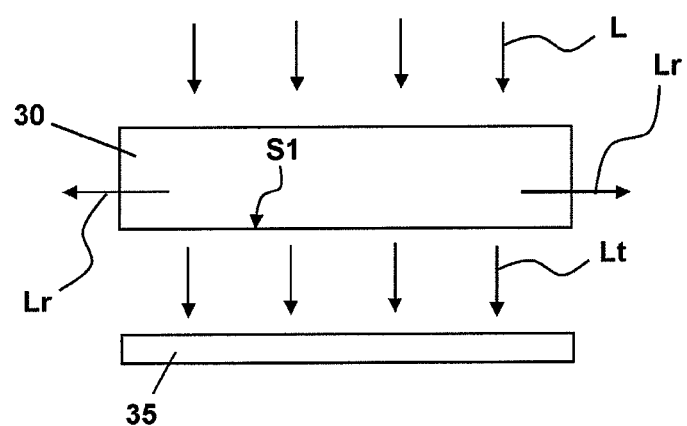
FIG. 1 is a cross-sectional view for illustrating a configuration of an optical shutter according to an exemplary embodiment.

Reference will now be made in detail to exemplary embodiments of an optical shutter using a total internal reflection angle controlling medium, a method of operating the optical shutter, and an apparatus including the optical shutter, examples of which are illustrated in the accompanying drawings. In the drawings, the thicknesses of layers and regions are exaggerated for clarity.

FIG. 1 is a cross-sectional view for illustrating a configuration of an optical shutter according to an exemplary embodiment.

Referring to FIG. 1, the optical shutter according to the present exemplary embodiment may include an active solid state medium 30 for controlling an angle of total internal reflection. The active solid state medium 30 for controlling the angle of total internal reflection (hereinafter, a total internal reflection angle controlling medium 30) may have a total internal reflection surface at which an angle of total internal reflection is changed by an external action, i.e., input. The total internal reflection angle controlling medium 30 may be a material including lithium niobate (LiNbO3), KTN ($KTa_xLn_{1-x}O_3$), or the like, which has an electro-optical effect. A shape of the total internal reflection angle controlling medium 30 in FIG. 1 is schematically shown. The external action may affect a crystalline characteristic of the total internal reflection angle controlling medium 30. An example of the crystalline characteristic may be a refractive index characteristic of the total internal reflection angle controlling medium 30. Due to the external action, the angle of total internal reflection of the total internal reflection angle controlling medium 30 may become smaller than a fixed angle of total internal reflection of the total internal reflection angle controlling medium 30.

The fixed angle of total internal reflection indicates a unique angle of total internal reflection at a total internal reflection surface S1 of the total internal reflection angle controlling medium 30 when the external action is not applied. Thus, the unique angle of total internal reflection of the total internal reflection angle controlling medium 30 may vary according to the material of forming the total internal reflection angle controlling medium 30.

The external action may be an electric field. The electric field is formed between two electrodes having an electrical potential difference therebetween. Thus, by disposing the total internal reflection angle controlling medium 30 between the two electrodes having the electrical potential difference, the electric field may be applied to the total internal reflection angle controlling medium 30. The two electrodes may be arranged in a light-incident surface and a light-exit surface of the total internal reflection angle controlling medium 30, respectively. Something else, other than the electric field, may be used so long as it is capable of changing the crystalline characteristic of the total internal reflection angle controlling medium 30. The external action may be adjusted according to time. Thus, the external action may be sequentially changed, and accordingly, the angle of total internal reflection of the total internal reflection angle controlling medium 30 may also be sequentially changed.

Light emitted from the optical shutter including the total internal reflection angle controlling medium 30 may be incident on an image sensor 35. The image sensor 35 may be a charge coupled device (CCD), a complementary metal oxide semiconductor (CMOS) sensor, or a random optical sensor that may transform an optical image, which is received from the total internal reflection angle controlling medium 30, into an electrical signal, and may output the electrical signal.

In FIG. 1, L indicates incident light entering the total internal reflection angle controlling medium 30. An incident angle of the incident light L that is incident on the total internal reflection surface S1 may be fixed as a given angle. Here, when the angle of total internal reflection of the total internal reflection angle controlling medium 30 becomes less than the fixed angle of total internal reflection according to a scale, i.e., an amount, of the external action, the incident angle of the incident light L may be less than the fixed angle of total internal reflection of the total internal reflection angle controlling medium 30 but may be greater than a minimum angle of total internal reflection which may be formed in the total internal reflection angle controlling medium 30 by the external action.

On the other hand, when the angle of total internal reflection of the total internal reflection angle controlling medium 30 becomes greater than the fixed angle of total internal reflection according to a scale of the external action, the incident angle of the incident light L may be greater than the fixed angle of total internal reflection of the total internal reflection angle controlling medium 30 but may be smaller than a maximum angle of total internal reflection which may be formed in the total internal reflection angle controlling medium 30 by the external action.

In FIG. 1, Lt indicates light that is not totally reflected but partially refracted at the total internal reflection surface S1 of the total internal reflection angle controlling medium 30, when the total internal reflection angle controlling medium 30 is in a shutter-on state, that is, when the external action may or may not occur. The refracted light Lt is incident on the image sensor 35. Thus, the refracted light Lt has information to be actually measured or obtained. In FIG. 1, Lr indicates light that is totally reflected at the total internal reflection surface S1 of the total internal reflection angle controlling medium 30, when the total internal reflection angle controlling medium 30 is in a shutter-off state, that is, when the angle of total internal reflection of the total internal reflection angle controlling medium 30 at the total internal reflection surface S1 becomes smaller than the fixed angle of total internal reflection by the external action.

Figure 2:
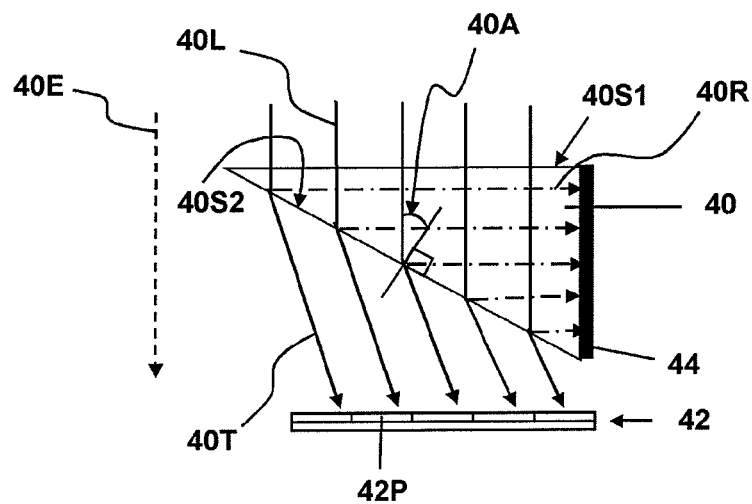
FIG. 2 is a diagram for illustrating a configuration of the optical shutter when a total internal reflection angle controlling medium of FIG. 1 corresponds to a total internal reflection prism.

FIG. 2 is a diagram for illustrating a configuration of the optical shutter when the total internal reflection angle controlling medium 30 of FIG. 1 corresponds to a total internal reflection prism 40.

Referring to FIG. 2, the total internal reflection prism 40 may be a rectangular prism. An inclined surface 40S2 of the total internal reflection prism 40 indicates a total internal reflection surface. An incident light 40L is perpendicular to a light-incident surface 40S1 of the total internal reflection prism 40. An image sensor 42 may be arranged so as to face the inclined surface 40S2 that is the total internal reflection surface. The image sensor 42 may be arranged at a position that the incident light 40L may reach after being refracted at the inclined surface 40S2. For example, the image sensor 42 may be arranged at a position on which refracted light 40T may be perpendicularly incident thereon. The image sensor 42 may be arranged at a position on which the refracted light 40T may be incident thereon at an incident angle, and here, a refracted-light path changing unit may be arranged between the total internal reflection prism 40 and the image sensor 42. The refracted-light path changing unit will be described later.

Examining a travel path of the incident light 40L by referring to FIG. 2, the incident light 40L passes through the light-incident surface 40S1 of the total internal reflection prism 40 and then is incident on the inclined surface 40S2, thereby having a given angle 40A. Here, if the given angle 40A is equal to or greater than a fixed angle of total internal reflection of the total internal reflection prism 40, the incident light 40L is totally reflected at the inclined surface 40S2 toward an inside of the total internal reflection prism 40, and thus the incident light 40L does not reach the image sensor 42. In FIG. 2, 40R indicates light that is totally reflected at the inclined surface 40S2. A light absorbing unit 44 may be arranged on a surface of the total internal reflection prism 40 via which the totally reflected light 40R is emitted. The light absorbing unit 44 may be a light absorbing film.

If the given angle 40A is less than the fixed angle of total internal reflection of the total internal reflection prism 40, the incident light 40L does not satisfy a total internal reflection condition, and thus is refracted at the inclined surface 40S2. The refracted light 40T reaches the image sensor 42.

Meanwhile, as an external action, an electric field 40E due to a voltage application is applied to the total internal reflection prism 40, an angle of total internal reflection of the total internal reflection prism 40 may be changed in two ways. The first case is that the angle of total internal reflection of the total internal reflection prism 40 becomes smaller than the fixed angle of total internal reflection of the total internal reflection prism 40 as an intensity of the electric field 40E increases, and the second case is that the angle of total internal reflection of the total internal reflection prism 40 becomes greater than the fixed angle of total internal reflection of the total internal reflection prism 40 as the intensity of the electric field 40E increases.

In the first case, the given angle 40A that is an incident angle of the incident light 40L is less than the fixed angle of total internal reflection of the total internal reflection prism 40 but is greater than a minimum angle of total internal reflection which may be formed in the total internal reflection prism 40 according to the application of the electric field 40E.

In the second case, the incident angle 40A of the incident light 40L is greater than the fixed angle of total internal reflection of the total internal reflection prism 40 but is less than a maximum angle of total internal reflection which may be formed in the total internal reflection prism 40 according to the application of the electric field 40E. The image sensor 42 includes a plurality of pixels 42P but may include only one pixel. The image sensor 42 may be an entire image sensor of the optical shutter, or may be a part of an entire image sensor which includes at least one pixel. In other words, the total internal reflection prism 40 of FIG. 2 may be a total internal reflection angle controlling medium corresponding to the entire image sensor of the optical shutter. Also, the total internal reflection prism 40 may be a total internal reflection angle controlling medium that corresponds to a part of the entire image sensor which includes at least one pixel. That is, as the total internal reflection angle controlling medium, the optical shutter may include only one total internal reflection prism 40, or may include a prism array formed of a plurality of the total internal reflection prisms 40. In the case of the prism array, the total internal reflection prism 40 of FIG. 2 may correspond to a prism unit which forms the prism array.

Figure 3:
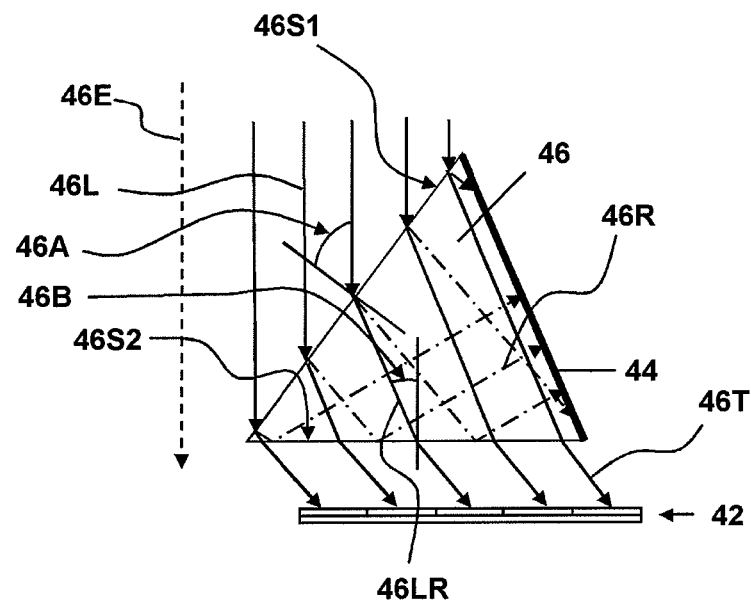
FIG. 3 is a diagram for illustrating a configuration of the optical shutter using a different type of prism, instead of the total internal reflection prism of FIG. 2.

FIG. 3 is a diagram for illustrating a configuration of the optical shutter using a different type of prism (hereinafter, a second prism 46), instead of the total internal reflection prism 40 of FIG. 2.

Referring to FIG. 3, the second prism 46 has a light-incident surface 46S1 that is inclined with respect to incident light 46L. Also, the second prism 46 has a total internal reflection surface 46S2 that is parallel with an image sensor 42. The light-incident surface 46S1 and the total internal reflection surface 46S2 form a given angle that is less than about 90 degrees. A light absorbing unit 44 is arranged on a surface of the second prism 46 via which light 46R that is totally reflected at the total internal reflection surface 46S2 is emitted. The light absorbing unit 44 may be a light absorbing film coated on the surface via which the totally reflected light 46R is emitted. The image sensor 42 may be formed at a position on which light 46T that is refracted at the total internal reflection surface 46S2 of the second prism 46 is perpendicularly or inclinedly incident thereon. In the case where the image sensor 42 is disposed in such a manner that the refracted light 46T is inclinedly incident on the image sensor 42, a unit (not shown) for changing an optical path of the refracted light 46T may be arranged between the image sensor 42 and the total internal reflection surface 46S2 of the second prism 46. The light 46T refracted by the unit is perpendicularly incident on the image sensor 42. The unit will be described later. A material of the second prism 46 may be equal to or different from that of the total internal reflection prism 40 of FIG. 2.

A path of the incident light 46L is examined with reference to FIG. 3. First, the path of the incident light 46L is examined when the external action is not applied. The incident light 46L enters the light-incident surface 46S1 at an incident angle 46A. The incident angle 46A is less than about 90 degrees. The incident light 46L is first refracted at the light-incident surface 46S1 by a given angle. At this time, a first refraction angle of the incident light 46L is determined according to Snell's law. The incident light 46L that is first refracted at the light-incident surface 46S1 is second refracted at the total internal reflection surface 46S2, thereby being incident on the image sensor 42 or being totally reflected so as to be absorbed by the light absorbing unit 44. According to the incident angle 46A of the incident light 46L, the incident light 46L at the total internal reflection surface 46S2 is second refracted or totally reflected.

Next, the path of the incident light 46L is examined, when the external action occurs, e.g., when an electric field 46E is applied to the second prism 46. According to an intensity of the external action, a refraction rate of the second prism 46 varies. For example, in the case where the second prism 46 is a KTN(KTaLnO3) prism, the refraction index of the second prism 46 may be adjusted in the range of about 2.3 to about 2.4 by adjusting the intensity of the external action.

A case in which an angle of total internal reflection at the total internal reflection surface 46S2 of the second prism 46 is decreased as an intensity of the electric field 46E increases will now be described. The incident angle 46A of the incident light 46 may be fixed as a given angle. An incident angle 46B formed when light incident on the total internal reflection surface 46S, that is, light 46LR that is first refracted on the light-incident surface 46S1 is incident on the total internal reflection surface 46S2 is less than a fixed angle of total internal reflection at the total internal reflection surface 46S2. Thus, the incident light 46L is incident on the light-incident surface 46S1 with the incident angle 46A at which the first refracted light 46LR may be incident on the total internal reflection surface 46S2 with the incident angle 46B that is less than the fixed angle of total internal reflection of the second prism 46. At this time, when the electric field 46E is applied to the second prism 46, the angle of total internal reflection at the total internal reflection surface 46S2 of the second prism 46 is less than the fixed angle of total internal reflection at the total internal reflection surface 46S2. An intensity in voltage of the applied electric field 46E may be in the range of about 0V to about 150V.

If the angle of total internal reflection of the second prism 46 is a minimum angle of total internal reflection when the intensity of the electric field 46E is maximum, the incident angle 46B of the first refracted light 46LR with respect to the total internal reflection surface 46S2 may be greater than the minimum angle of total internal reflection. That is, the incident angle 46B of the first refracted light 46LR may have a value between the fixed angle of total internal reflection of the second prism 46 and the minimum angle of total internal reflection. Thus, when the angle of total internal reflection at the total internal reflection surface 46S2 becomes smaller than the incident angle 46B of the first refracted light 46LR according to the intensity of the applied electric field 46E, the first refracted light 46LR is totally reflected at the total internal reflection surface 46S2 and then is absorbed by the light absorbing unit 44.

If the angle of total internal reflection of the second prism 46 becomes greater than the incident angle 46B of the first refracted light 46LR according to a decrease in the electric field 46E, the first refracted light 46LR does not satisfy a total internal reflection condition any more and thus the first refracted light 46LR passes through the total internal reflection surface 46S2 and is refracted toward the image sensor 42. In this manner, by adjusting the intensity of the electric field 46E applied to the second prism 46, the fixed angle of total internal reflection of the second prism 46 may be adjusted so that it is possible to adjust total internal reflection and retraction of the first refracted light 46LR incident on the total internal reflection surface 46S2.

Meanwhile, when the angle of total internal reflection at the total internal reflection surface 46S2 of the second prism 46 is increased according to the intensity of the electric field 46E, the incident angle 46B of the first refracted light 46LR with respect to the total internal reflection surface 46S2 is greater than the fixed angle of total internal reflection of the second prism 46.

If the angle of total internal reflection of the second prism 46 is a maximum angle of total internal reflection when the intensity of the electric field 46E is at a maximum in the above voltage range, the incident angle 46B of the first refracted light 46LR is less than the maximum angle of total internal reflection. That is, the incident angle 46B of the first refracted light 46LR may have a value that is greater than the fixed angle of total internal reflection of the second prism 46 and is less than the maximum angle of total internal reflection. Thus, in the case where the angle of total internal reflection of the second prism 46 is increased according to the intensity of the electric field 46E, the first refracted light 46LR satisfies an initial total internal reflection condition, but does not satisfy the total internal reflection condition according to application of the electric field 46E, and then passes through the total internal reflection surface 46S2 so that the optical shutter initially starts in a shutter-off state, and then is changed to a shutter-on state according to the increase of the intensity of the electric field 46E.

It is the inverse case when the angle of total internal reflection of the second prism 46 is decreased according to the intensity of the electric field 46E. That is, the optical shutter initially starts in the shutter-on state, and then is changed to the shutter-off state according to the increase in the intensity of the electric field 46E.

Next, the optical shutter including the total internal reflection angle controlling medium 30 and a light path changing unit will now be described. With respect to units that are described above, the same reference numerals are used.

Figure 4:
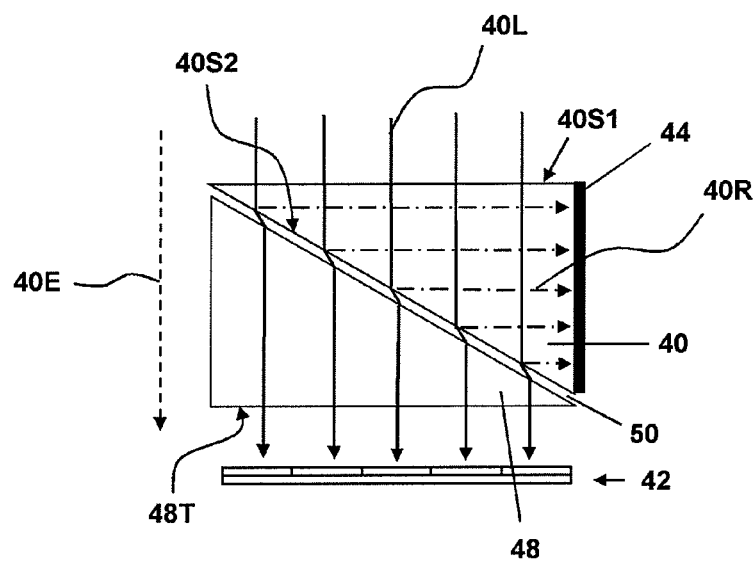
FIG. 4 is a diagram of the optical shutter of FIG. 2 which includes a light path changing unit according to another exemplary embodiment.

FIG. 4 is a diagram of the optical shutter of FIG. 2 which includes a light path changing unit according to another exemplary embodiment.

Referring to FIG. 4, the light path changing unit, a third prism 48 is arranged between a total internal reflection prism 40 and an image sensor 42. The total internal reflection prism 40 and the third prism 48 may be bundled and called an active solid state electro-optical medium, i.e., the optical shutter that has a total internal reflection surface at which an angle of total internal reflection is changed by an external action. Here, the total internal reflection prism 40 may be called a first medium at which the angle of total internal reflection is changed by the external action, and the third prism 48 may be called a second medium for allowing light to be always perpendicular to the image sensor 42, wherein the light enters the image sensor 42 from the first medium. The terms may be applied to all types of optical shutters that include two prisms or two prism arrays including a prism or a prism array for allowing light to be perpendicularly incident on an image sensor 44, which will be described later.

The third prism 48 may be a rectangular prism. The third prism 48 may be substantially the same as the total internal reflection prism 40. Although materials of the total internal reflection prism 40 and the third prism 48 are different, refractive indexes of the total internal reflection prism 40 and the third prism 48 are greater than a refractive index of air. Inclined surfaces of the total internal reflection prism 40 and the third prism 48 face each other. The inclined surfaces of the total internal reflection prism 40 and the third prism 48 are adjacent to each other but do not contact each other. Thus, a gap 50 is uniformly formed between the inclined surfaces of the total internal reflection prism 40 and the third prism 48.

A thickness of the gap 50 may be from about 1 μm to about 2 μm but may be smaller than this. Although there is air in the gap 50, another material may exist in the gap 50. Here, a material existing in the gap 50 is transparent and has a refractive index that is less than those of the total internal reflection prism 40 and the third prism 48. As long as the material satisfies these conditions, the type of material existing in the gap 50 may not be limited. Since the thickness of the gap 50 is uniform, the gap 50 functions as an optical medium for moving in parallel a travel path of light, which has passed through a total internal reflection surface 40S2 of the total internal reflection prism 40, by a given distance in a direction perpendicular to the travel path of the light. Here, the distance moved in parallel is in proportion to the thickness of the gap 50. The inclined surface of the third prism 48 is a light-incident surface on which the light passing through the gap 50 is incident thereon, and faces the inclined surface of the total internal reflection prism 40, that is, the total internal reflection surface 40S2.

A light-exit surface 48T of the third prism 48 is parallel with a light-incident surface 40S1 of the total internal reflection prism 40, and the image sensor 42. Thus, light that has passed through the gap 50 and is incident on the third prism 48 passes through the third prism 48 on the same path as that of light that has entered the total internal reflection prism 40 and passes through the total internal reflection prism 40 in an inverse direction from the total internal reflection surface 40S2. Thus, when light, which is perpendicularly incident on the light-incident surface 40S1 of the total internal reflection prism 40, passes through the light-exit surface 48T of the third prism 48, the light is emitted perpendicular to the light-exit surface 48T. That is, a refraction angle of the emitted light at the light-exit surface 48T is 0 degrees. Since the image sensor 42 is parallel with the light-exit surface 48T of the third prism 48, the light passing through the light-exit surface 48T of the third prism 48 is perpendicularly incident on the image sensor 42.

In this manner, by arranging the third prism 48, a path of the light that is refracted on the total internal reflection surface 40S2 of the total internal reflection prism 40 may be changed so that the light may be perpendicularly incident on the image sensor 42. By arranging the third prism 48, the image sensor 42 may be disposed right under the total internal reflection prism 40 so that a horizontal size of the optical shutter may be reduced. In cases of FIGS. 2 and 3, the image sensor 42 may be disposed so that the refracted light 40T and 46T may be perpendicular to the image sensor 42. The optical medium existing between the third prism 48 and the image sensor 42 may be substantially the same as that existing in the gap 50.

Figure 5:
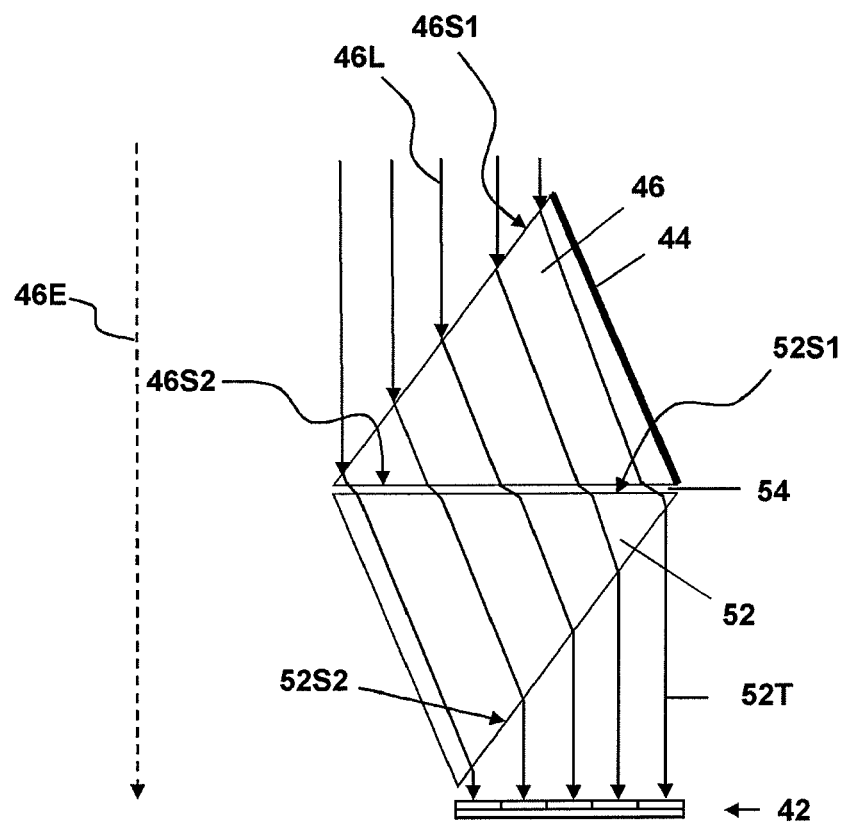
FIG. 5 is a diagram of the optical shutter of FIG. 3 which includes a light path changing unit according to another exemplary embodiment.

FIG. 5 is a diagram of the optical shutter of FIG. 3 which includes a light path changing unit according to another exemplary embodiment.

Referring to FIG. 5, the light path changing unit, a fourth prism 52 is arranged between the second prism 46 and the image sensor 42. The fourth prism 52 functions to change a path of light emitted from the total internal reflection surface 46S2 of the second prism 46, thus allowing the light to be perpendicularly incident on the image sensor 42. The incident light 46L to be incident on the light-incident surface 46S1 of the second prism 46 is in a direction perpendicular to the image sensor 42.

The fourth prism 52 may be equal to the second prism 46 with respect to a shape and functions. A material of the fourth prism 52 may be equal to or different from a material of the second prism 46. Although the materials are different, refractive indexes of the second and fourth prisms 46 and 52 may be higher than air, and may be greater than a refractive index of an optical medium filled in a gap 54 between the second and fourth prisms 46 and 52.

With respect to disposition of the fourth prism 52, a light-incident surface 52S1 of the fourth prism 52 corresponds to the total internal reflection surface 46S2 of the second prism 46, and the light-incident surface 52S1 and the total internal reflection surface 46S2 are very close to each other but do not contact each other. Thus, the gap 54 is formed between the light-incident surface 52S1 of the fourth prism 52 and the total internal reflection surface 46S2 of the second prism 46. The light-incident surface 52S1 and the total internal reflection surface 46S2 face each other, and thus the gap 54 has a uniform thickness. Thus, the gap 54 may perform substantially the same functions as those performed by the gap 50 of FIG. 4.

A light-exit surface 52S2 of the fourth prism 52 corresponds to the light-incident surface 46S1 of the second prism 46. According to such disposition of the fourth prism 52, light that has passed through the gap 54 and is incident on the fourth prism 52 follows the same path as that of a light that is incident on the total internal reflection surface 46S2 of the second prism 46 and then travels in an inverse direction. Thus, light refracted on the light-exit surface 52S2 of the fourth prism 52 travels in parallel with the incident light 46L that is incident on the light-incident surface 46S1 of the second prism 46. The incident light 46L that is incident on the light-incident surface 46S1 of the second prism 46 is perpendicular to the image sensor 42. Thus, light 52T emitted from the light-exit surface 52S2 of the fourth prism 52 is perpendicularly incident on the image sensor 42.

In FIG. 5, the second and fourth prisms 46 and 52 may correspond to the entire of the image sensor 42, but may also correspond to some pixels of the image sensor 42. For example, the second and fourth prisms 46 and 52 may correspond to at least one pixel, or two or more pixels, which are included in the image sensor 42. The optical shutter may include a prism array including a plurality of the second prisms 46 illustrated in FIG. 3, or may include a prism array including a plurality of structures, each of which include the second and fourth prisms 46 and 52 shown in FIG. 5.

Figure 6:
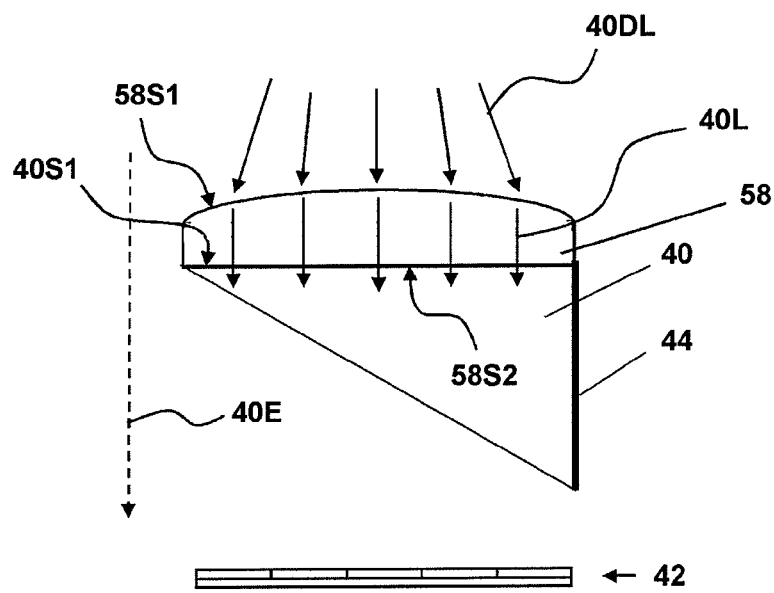
FIG. 6 is a diagram of an optical shutter including a unit for changing a path of incident light so as to allow the incident light to be parallel light, wherein the incident light is incident on a light-incident surface of a total internal reflection angle controlling medium according to another exemplary embodiment.

FIG. 6 is a diagram of an optical shutter including a unit for changing a path of incident light so as to allow the incident light to be parallel light, wherein the incident light is incident on a light-incident surface of a total internal reflection angle controlling medium according to another exemplary embodiment. The unit for changing a path of incident light (hereinafter, the incident light path changing unit) may be a lens unit. In other exemplary embodiments, the units for changing the path of incident light mentioned above and below, may change a shape of incident light. In yet other exemplary embodiments, the units for changing the path of incident light mentioned above and below, e.g., incidence light path changing units, may be units for changing a shape of incident light or incident light shape changing units.

Referring to FIG. 6, a collimating means 58 is arranged on the light-incident surface 40S1 of the total internal reflection prism 40. The collimating means 58 changes spherical-wave light 40DL that is incident on the total internal reflection prism 40 into plane-wave light 40L that is perpendicularly incident on the light-incident surface 40S1 of the total internal reflection prism 40. The collimating means 58 may be a lens. A light-exit surface 58S2 of the collimating means 58 may be parallel with the light-incident surface 40S1 of the total internal reflection prism 40, and contacts the light-incident surface 40S1 of the total internal reflection prism 40. A light-incident surface 58S1 of the collimating means 58 is a convex surface.

Figure 7:
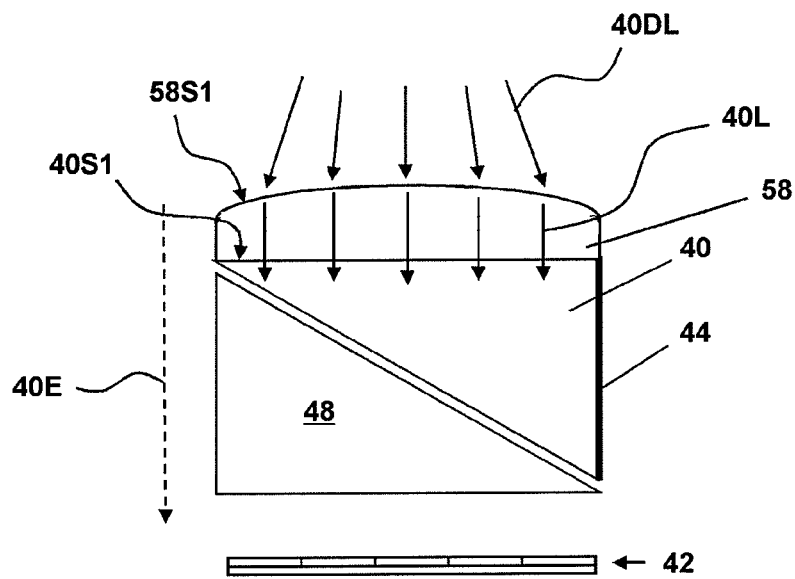
FIG. 7 is a diagram of the optical shutter of FIG. 4 which includes the incident light path changing unit according to another exemplary embodiment.

FIG. 7 is a diagram of the optical shutter of FIG. 4 which includes the incident light path changing unit.

Referring to FIG. 7, the collimating means 58 is arranged on the light-incident surface 40S1 of the total internal reflection prism 40. The collimating means 58 may be substantially the same as that described with reference to FIG. 6.

Figure 8:
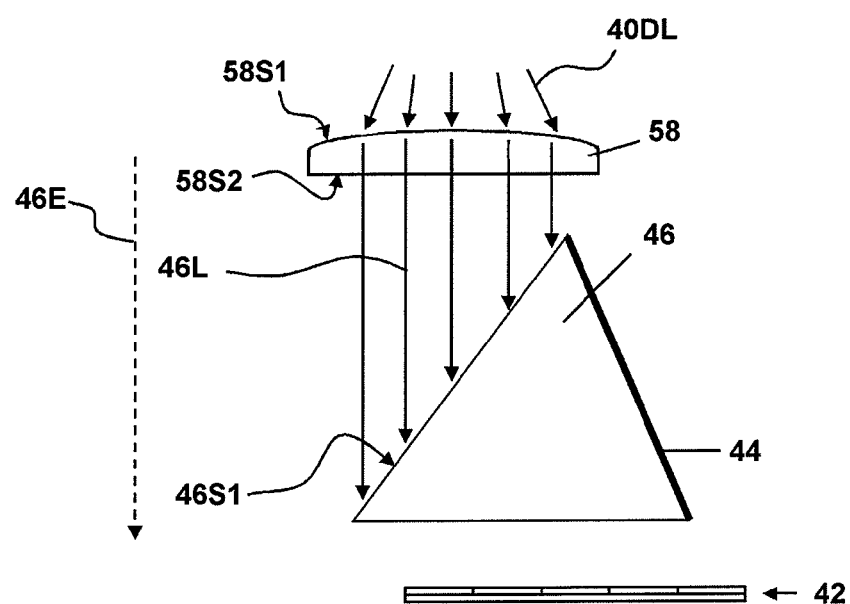
FIG. 8 is a diagram of the optical shutter of FIG. 3 which further includes an incident light path changing unit according to another exemplary embodiment.

FIG. 8 is a diagram of the optical shutter of FIG. 3 which further includes the collimating means 58 as an incident light path changing unit. Due to the manner in which the collimating means 58 is arranged, the light 46L to be incident on the second prism 46 is parallel light although the spherical-wave light 40DL is incident on the optical shutter.

Figure 9:
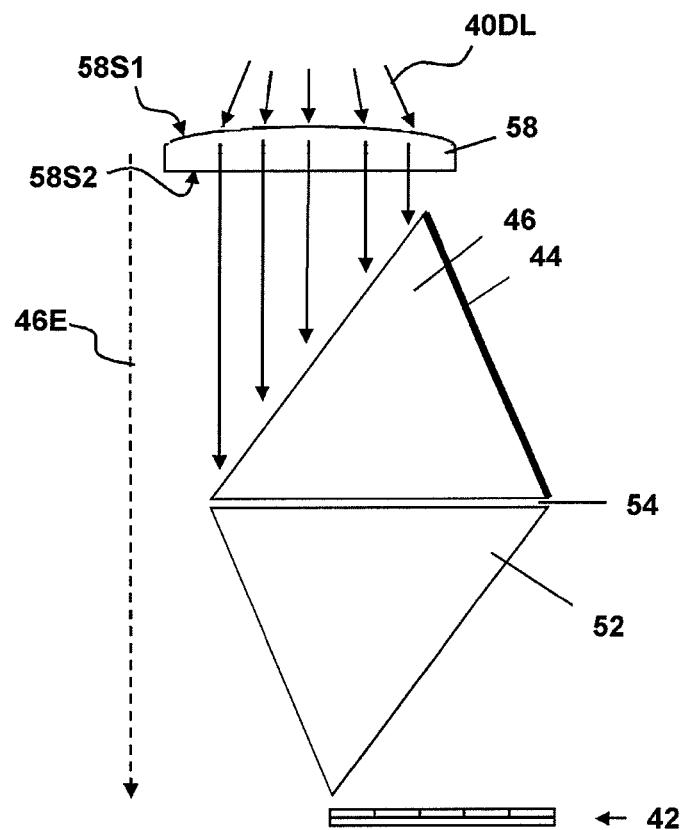
FIG. 9 is a diagram of the optical shutter of FIG. 5 which further includes an incident light path changing unit according to another exemplary embodiment.

FIG. 9 is a diagram of the optical shutter of FIG. 5 which further includes the collimating means 58 as an incident light path changing unit. The collimating means 58 of FIG. 9 may perform substantially the same functions as those performed by the collimating means 58 of FIG. 8.

Next, an optical shutter including an array formed of a plurality of total internal reflection angle controlling mediums 30 will now be described. The plurality of total internal reflection angle controlling mediums 30 which form an array included in the optical shutter may be equal or similar to that illustrated in FIGS. 1 through 5.

Figure 10A:
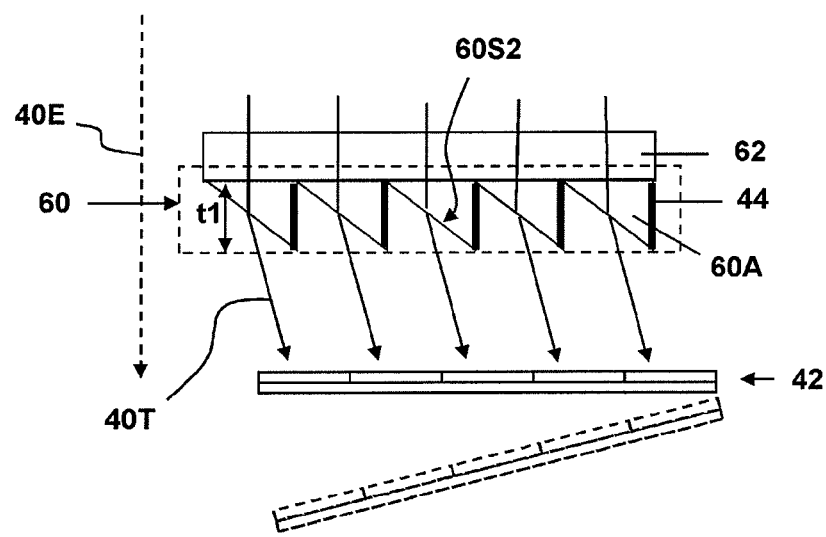
FIG. 10A is a diagram of an optical shutter including an array in which the total internal reflection prism of FIG. 2 is used as a unit of the plurality of total internal reflection angle controlling mediums according to another exemplary embodiment.
Figure 10B:
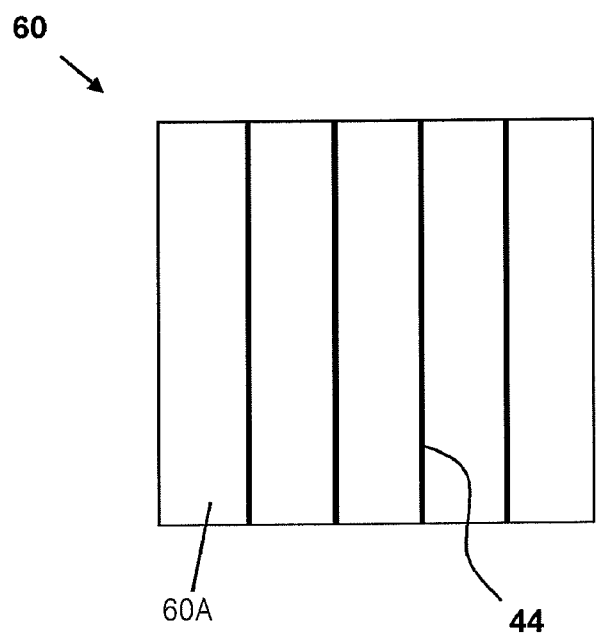
FIG. 10B is a plane view of a first prism array of FIG. 10A.

FIGS. 10A and 10B are diagrams of an optical shutter including an array in which the total internal reflection prism 40 of FIG. 2 is used as a unit of a total internal reflection angle controlling mediums. With respect to units that are previously described, like reference numerals are used.

Referring to FIG. 10A, the optical shutter includes a first substrate 62 and a first prism array 60. The first prism array 60 is attached on a light-exit surface of the first substrate 62. The first substrate 62 may be an electro-optical substrate, a refractive index of which is changed according to an external action, and which is transparent to incident light. The first substrate 62 may be formed of substantially the same material as a microprism 60A forming the first prism array 60. Also, the first substrate 62 may be formed of a material having a refractive index that is close to a refractive index of the microprism 60A. The first substrate 62 may be formed of glass or sapphire. The incident light entering the first substrate 62 may be parallel light. The microprism 60A may be equal to the total internal reflection prism 40 of FIG. 2 with respect to a shape, a material, and functions. A light absorbing unit 44 is attached on a surface via which total internal reflection light of the microprism 60A is emitted. The first prism array 60 is formed of a plurality of the microprisms 60A.

The first prism array 60 may be formed in such a manner that an electro-optical substrate to be used as the microprisms 60A is deposited or grown on the other surface of the first substrate 62, i.e., the light-exit surface so as to have a thickness equal to or greater than a thickness t1 of the first prism array 60, and then the electro-optical substrate is cut or etched. Here, the thickness of the deposited or grown electro-optical substrate may be adjusted by the cutting operation, and then the cut electro-optical substrate may have substantially the same shape as the first prism array 60 via the etching operation. Alternatively, the first prism array 60 may be formed in a manner that the first substrate 62 and the electro-optical substrate are separately formed, then the electro-optical substrate is bonded to the first substrate 62, and the bonded electro-optical substrate is cut and etched as described above. Meanwhile, the electro-optical substrate may be patterned by the cutting and etching operations so as to have substantially the same shape as the first prism array 60, and then by using direction deposition, a light absorbing unit 44 may be formed on a surface via which light that is totally reflected from a total internal reflection surface 60S2 of each microprism 60A is emitted.

FIG. 10B is a plane view of the first prism array 60.

Referring to FIG. 10B, the plurality of the microprisms 60A are arranged in a stripe shape.

In FIG. 10A, light 40T that is refracted on the total internal reflection surface 60S2 of the first prism array 60 is inclinedly incident on an image sensor 42, that is, the refracted light 40T is incident on the image sensor 42 at an incident angle greater than about 0 degrees. However, the refracted light 40T may be perpendicularly incident on the image sensor 42. In order to make the refracted light 40T perpendicularly incident on the image sensor 42, the image sensor 42 may be disposed to be inclined with respect to the first substrate 62, as indicated by dotted lines.

Figure 11:
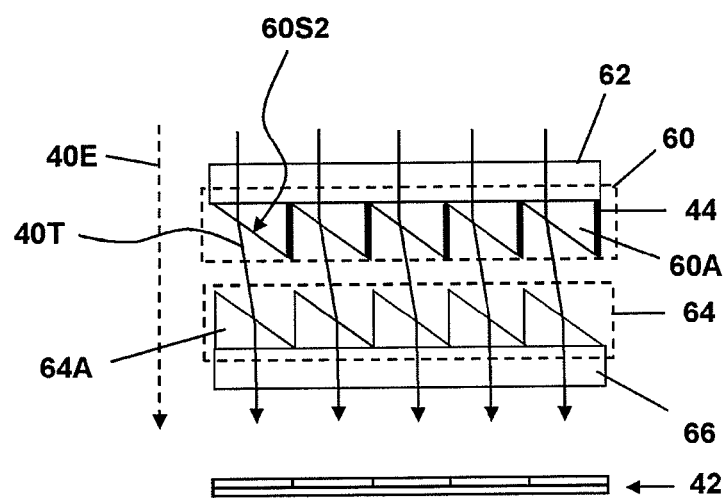
FIG. 11 is a cross-sectional view of a case in which a second prism array is arranged between an image sensor and a first prism array in the optical shutter of FIG. 10A.
Figure 13:
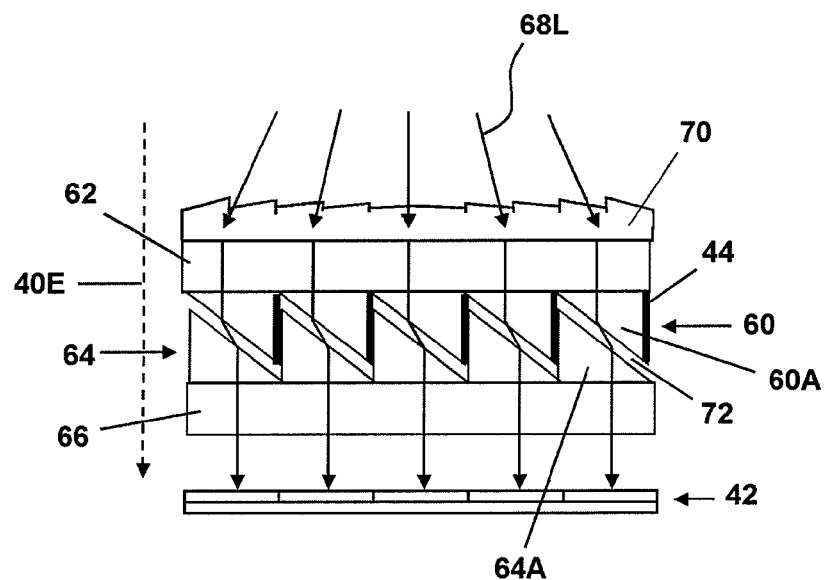
FIG. 13 is a cross-sectional view of the optical shutter of FIG. 11 further arranging an incident light path changing unit on a light incident surface of a first substrate.

Alternatively, as illustrated in FIG. 11, a second prism array 64 may be disposed between the image sensor 42 and the first prism array 60. The second prism array 64 is a unit for changing a path of the light 40T that is refracted on the total internal reflection surface 60S2 of the first prism array 60 so as to allow the light 40T to be perpendicularly incident on the image sensor 42. In other words, the second prism array 64 is a unit for changing a travel path of the refracted light 40T so as to make the travel path equal to a travel path of light incident on the first substrate 62. The first and second prism arrays 60 and 64 may be disposed to be adjacent to each other so that the microprisms 60A and 64A form a gap (refer to reference numeral 72 of FIG. 13) corresponding to the gap 50 by disposing the microprisms 60A and 64A in an arrangement similar to the total internal reflection prism 40 and the third prism 48 in FIG. 4. Such disposition is shown in FIG. 13. However, in FIG. 11, in order to clearly illustrate the first and second prism arrays 60 and 64, for convenience, a vertical distance between the first and second prism arrays 60 and 64 is exaggerated. A second substrate 66 is arranged between the second prism array 64 and the image sensor 42. The second prism array 64 is arranged on a light-incident surface of the second substrate 66. The second prism array 64 includes a plurality of the microprisms 64A. The microprism 64A may be equal to the third prism 48 of FIG. 4 with respect to a shape, a material, and functions. A material of the second substrate 66 may be equal to a material of the microprism 64A of the second prism array 64. Also, the material of the second substrate 66 may have a refractive index that is close to a refractive index of the microprism 64A. In addition, the material of the second substrate 66 may be substantially the same as that of the first substrate 62. Disposition between the microprism 64A of the second prism array 64 and the microprism 60A of the first prism array 60 may be substantially the same as disposition between the total internal reflection prism 40 and the third prism 48 in FIG. 4.

Figure 12:
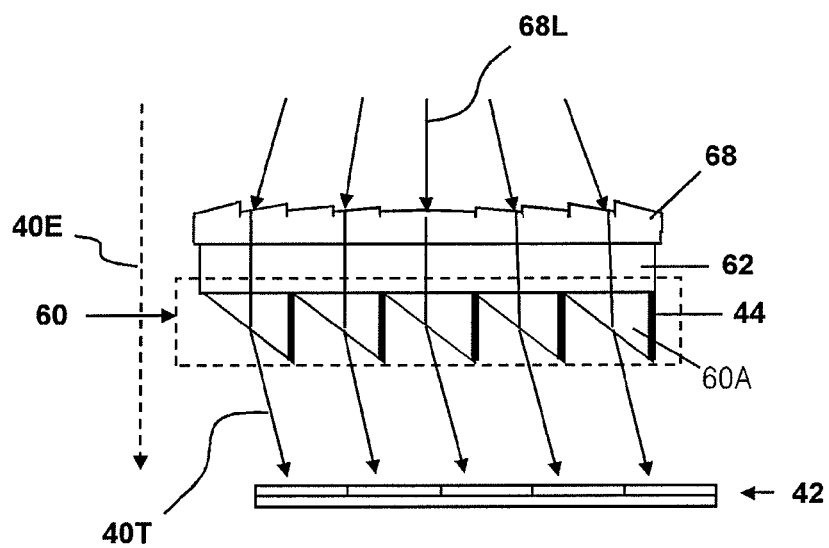
FIG. 12 is a cross-sectional view of the optical shutter of FIG. 10A further arranging an incident light path changing unit on a light incident surface of a first substrate.

Meanwhile, in the optical shutter of FIG. 10A, when the incident light entering the first substrate 62 is spherical-wave, that is, when the incident light is not the parallel light, as illustrated in FIG. 12, an incident light path changing unit 68 may be further arranged on the light-incident surface of the first substrate 62. The incident light path changing unit 68 may change a path of light 68L to be incident on the incident light path changing unit 68, thereby allowing parallel light to be incident on the light-incident surface of the first substrate 62. In other words, the incident light path changing unit 68 changes the path of the light 68L to be incident on the incident light path changing unit 68 so as to allow a travel path of the light 68L to be in the same direction. Accordingly, the light incident on the first prism array 60 becomes the parallel light so that the light is perpendicularly incident on a light-incident surface of each microprism 60A. The incident light path changing unit 68 may be a Fresnel lens sheet.

Next, in the optical shutter of FIG. 11, when the incident light entering the first substrate 62 is spherical-wave, as illustrated in FIG. 13, an incident light path changing unit 70 may be further arranged on the light-incident surface of the first substrate 62. The incident light path changing unit 70 may be substantially the same as the incident light path changing unit 68 of FIG. 12.

Figure 14A:
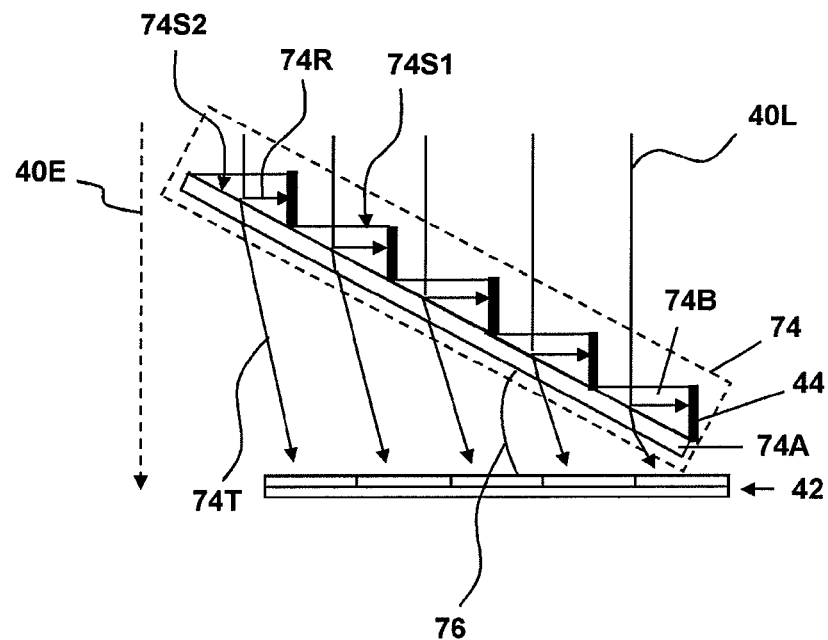
FIGS. 14A, 14B, and 14C are diagrams of an optical shutter including a prism array formed of a plurality of microprisms according to another exemplary embodiment.
Figure 14B:
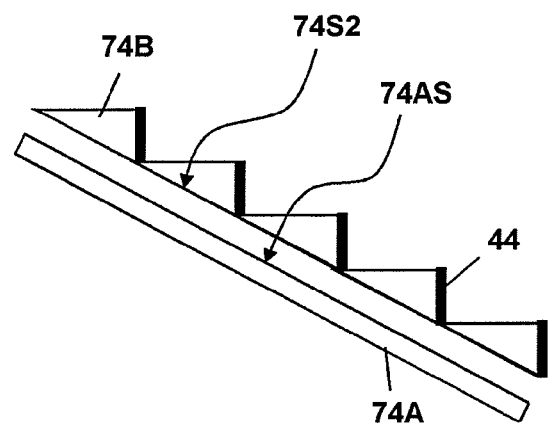
Figure 14C:
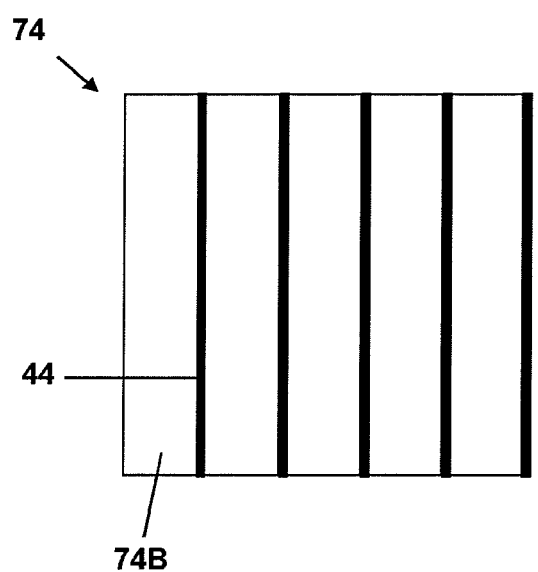

FIGS. 14A, 14B, and 14C are diagrams of an optical shutter including a prism array formed of a plurality of microprisms according to another exemplary embodiment.

Referring to FIG. 14A, the optical shutter includes a third prism array 74 and an image sensor 42. The third prism array 74 may include a third substrate 74A and a plurality of microprisms 74B. Each microprism 74B may correspond to an example of a total internal reflection angle controlling medium, and thus, another type of the total internal reflection angle controlling medium may be arranged instead of each microprism 74B. The third substrate 74A may be inclined at a given angle with respect to the image sensor 42. Accordingly, a light-incident surface 74AS of the third substrate 74A is inclined at the same angle with respect to the image sensor 42. The plurality of microprisms 74B are arranged on the light-incident surface 74AS of the third substrate 74A. The plurality of microprisms 74B are arranged in a stepped manner, and are attached on the light-incident surface 74AS of the third substrate 74A.

For convenience of description, in FIG. 14B, the third substrate 74A and the plurality of microprisms 74B are separated. Each microprism 74B is a rectangular prism, and may be substantially the same as the microprism 60A of FIG. 10A. Inclined surfaces of the plurality of microprisms 74B, that is, total internal reflection surfaces 74S2 of the plurality of microprisms 74B contact the light-incident surface 74AS of the third substrate 74A. Here, light-incident surfaces 74S1 of the plurality of microprisms 74B for receiving incident light 40L may be parallel with the image sensor 42. Thus, an interior angle 76 between the image sensor 42 and the third substrate 74A is equal to an interior angle between the light-incident surface 74S1 and the total internal reflection surface 74S2 in each microprism 74B.

However, in the case where the image sensor 42 is disposed so that light 74T from the third prism array 74 may be perpendicularly incident on the image sensor 42, the interior angle 76 between the image sensor 42 and the third substrate 74A may be different from the interior angle between the light-incident surface 74S1 and the total internal reflection surface 74S2 in each microprism 74B. The third substrate 74A may be a substrate transparent to light passing through the microprism 74B. A refractive index of the third substrate 74A may be greater than a refractive index of air, and may be less than a minimum refractive index of microprisms 74B by an external action.

The incident light 40L entering the optical shutter may be totally reflected or refracted on the total internal reflection surfaces 74S2 of the plurality of microprisms 74B according to a condition of the external action. Thus, the light-incident surface 74AS of the third substrate 74A receives light that is refracted on the total internal reflection surfaces 74S2 of the plurality of microprisms 74B. Light 74R that is totally reflected from the total internal reflection surfaces 74S2 of the plurality of microprisms 74B by the external action, e.g., an electric field 40E is emitted via a surface (hereinafter, a rectangular surface) that is perpendicular to each light-incident surface 74S1 of each microprism 74B. However, the rectangular surface is covered with a light absorbing unit 44. Thus, the totally reflected light 74R is absorbed by the light absorbing unit 44 so that the totally reflected light 74R is not incident on the neighboring microprism 74B.

As illustrated in FIGS. 14A and 14B, the microprisms 74B are arranged in a sequentially stepped manner from a highest part of the light-incident surface 74AS of the third substrate 74A to a lowest part of the light-incident surface 74AS of the third substrate 74A. Accordingly, assuming that the light 74R that is totally reflected from the total internal reflection surfaces 74S2 by the external action travels in parallel with the light-incident surface 74AS, the totally reflected light 74R may not affect the neighboring microprism 74B so that the light absorbing unit 44 may not be included in the optical shutter of FIGS. 14A, 14B, and 14C.

FIG. 14C is a plane view of the third prism array 74. In FIG. 14A, there is one to one correspondence between microprisms 74B and pixels of the image sensor 42. However, each microprism 74B may correspond to two or more pixels of the image sensor 42. This correspondence may be applied to the optical shutter described with reference to FIGS. 10 through 13, and may also be applied to an optical shutter to be described later. In this manner, when one prism array corresponds to a plurality of pixels, a process margin for forming a prism array may be enlarged so that formation of the prism array may be more easily achieved.

Figure 15:
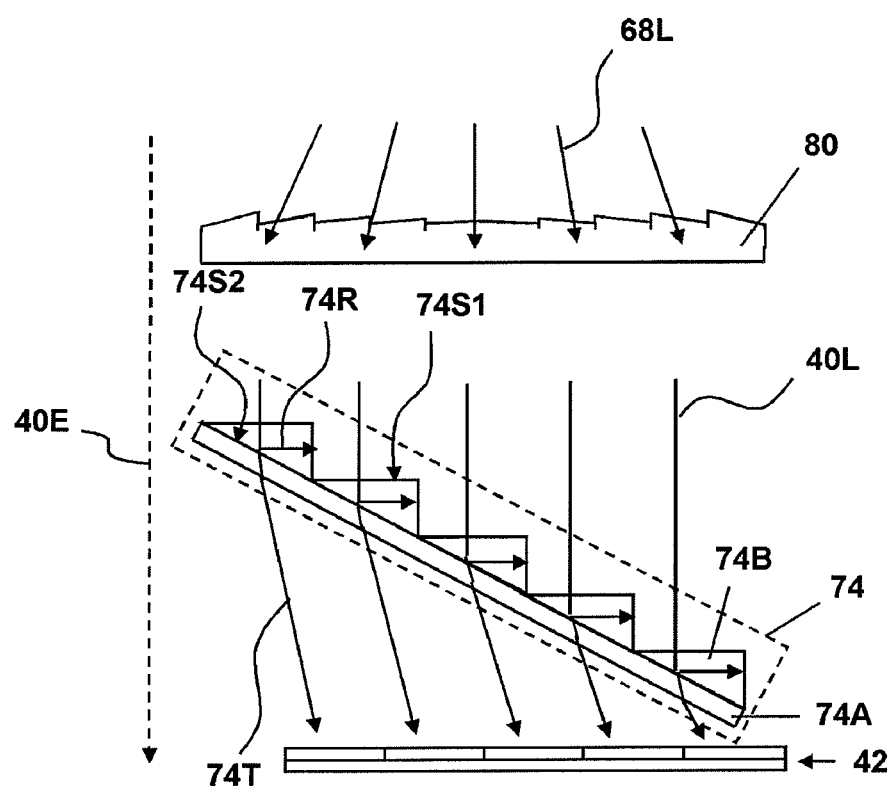
FIG. 15 is a cross-sectional view of the optical shutter of FIG. 14 further arranging an incident light path changing unit in front of a third prism array.

Meanwhile, when the incident light 40L in the optical shutter of FIG. 14A is non-parallel light, that is, when a wave surface of the incident light 40L is not plane, e.g., a spherical-wave, as illustrated in FIG. 15, a unit 80 for changing a path of the incident light 40L may be further arranged in front of the third prism array 74. The unit 80 (hereinafter, the incident light path changing unit 80) may be substantially the same as the incident light path changing units that have been previously described above.

Figure 16:
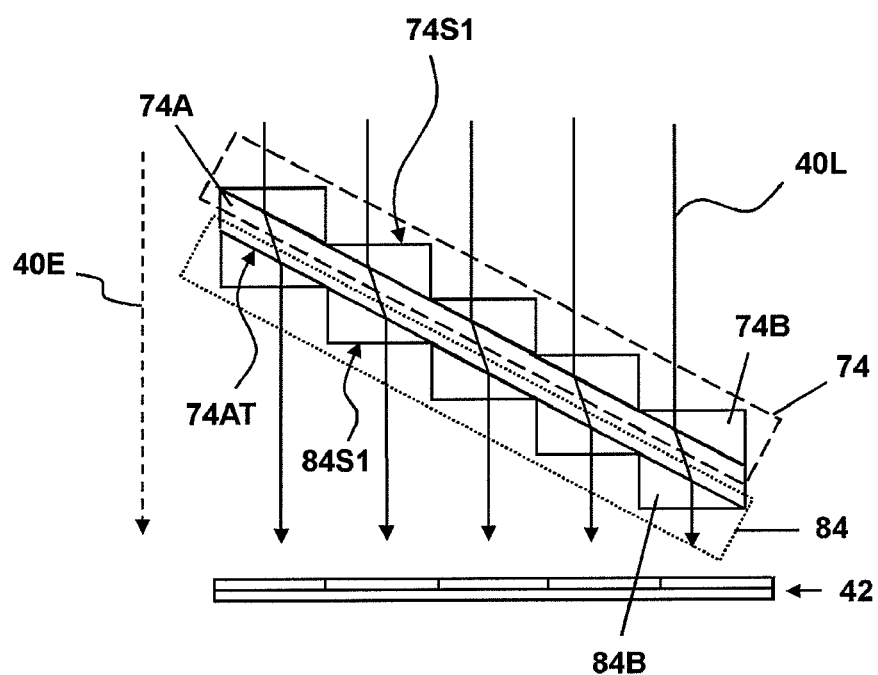
FIG. 16 is a cross-sectional view of the optical shutter of FIG. 14 further arranging a fourth prism array between the third prism array and an image sensor.

Alternatively, as illustrated in FIG. 16, a fourth prism array 84 may be further arranged between the third prism array 74 and the image sensor 42. The fourth prism array 84 may be a light path changing unit. The fourth prism array 84 causes light (refer to the light 74T of FIG. 14A) that is refracted from the third prism array 74 to the image sensor 42 to be perpendicularly incident on the image sensor 42. The fourth prism array 84 includes the third substrate 74A and a plurality of microprisms 84B. The third and fourth prism arrays 74 and 84 may share the third substrate 74A. The third substrate 74A may be formed by bonding two substrates. Here, one of the two substrates may be included in the third prism array 74, and the other one of the two substrates may be included in the fourth prism array 84. The plurality of microprisms 84B of the fourth prism array 84 may be substantially the same as the plurality of microprisms 74B of the third prism array 74.

The plurality of microprisms 84B of the fourth prism array 84 are attached on a light-exit surface 74AT of the third substrate 74A. An inclined surface of the plurality of microprisms 84B contacts the light-exit surface 74AT of the third substrate 74A. Light-exit surfaces 84S1 of the plurality of microprisms 84B correspond to the light-incident surfaces 74S1 of the plurality of microprisms 74B, and the plurality of microprisms 84B are attached so as to allow the light-incident surfaces 74S1 and the light-exit surfaces 84S1 be parallel with each other.

The plurality of microprisms 84B of the fourth prism array 84 vertically correspond to the plurality of microprisms 74B of the third prism array 74, respectively. That is, there is one to one correspondence between the microprisms 84B and the microprisms 74B. In FIG. 16, a path of incident light 40L that passes through the plurality of microprisms 74B of the third prism array 74, the third substrate 74A, and the plurality of microprisms 84B of the fourth prism array 84, and thus is perpendicularly incident on the image sensor 42, is no different from a path of the incident light 40L (refer to FIG. 4) that passes through the total internal reflection prism 40, the gap 50, and the third prism 48, and thus is perpendicularly incident on the image sensor 42.

Figure 17:
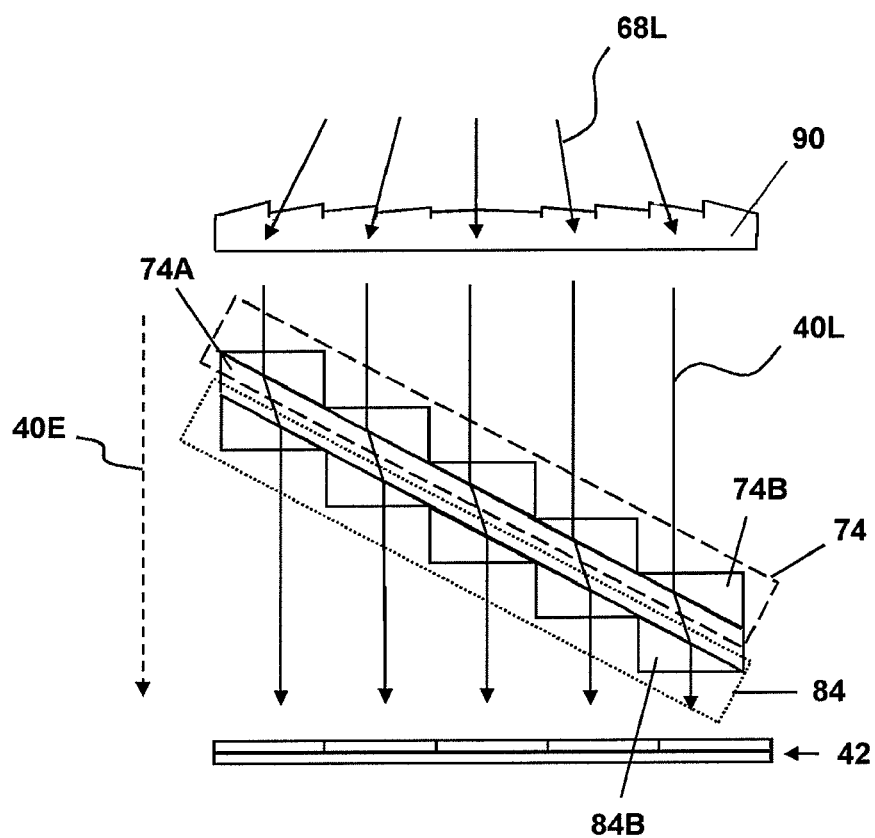
FIG. 17 is a cross-sectional view of the optical shutter of FIG. 16 further arranging an incident light path changing unit in front of a third prism array.

When non-parallel light is used as incident light in the optical shutter of FIG. 16, as illustrated in FIG. 17, an incident light path changing unit 90 may be arranged in front of the third prism array 74 so that non-parallel incident light 68L may be changed into parallel-incident light 40L. The incident light path changing unit 90 may be substantially the same as the incident light path changing unit 80 described with reference to FIG. 15.

Figure 18A:
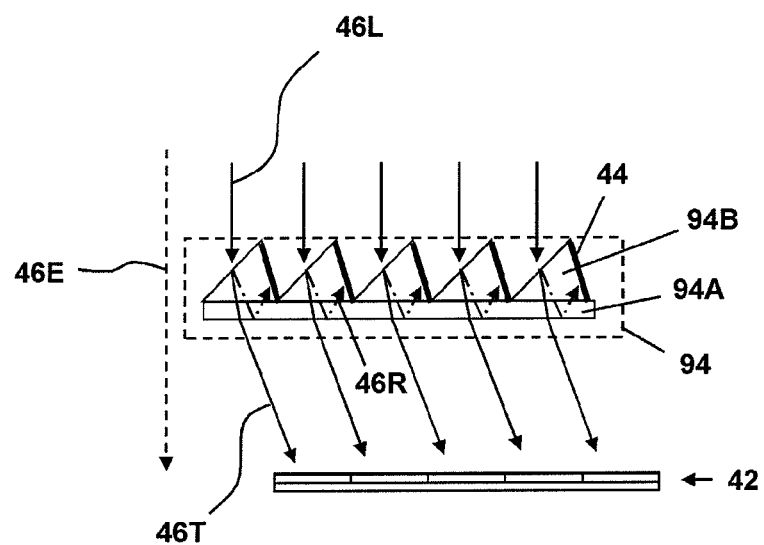
FIGS. 18A and 18B are diagrams of an optical shutter including a prism array formed of a plurality of microprisms according to another exemplary embodiment.
Figure 18B:
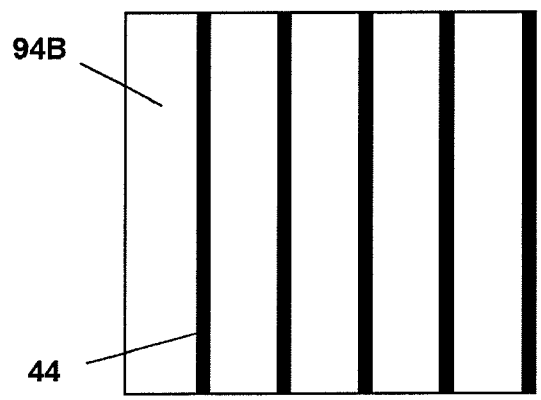

FIGS. 18A and 18B are diagrams of an optical shutter including a prism array formed of a plurality of microprisms according to another exemplary embodiment. With respect to units that are described above, the same reference numerals are used.

Referring to FIG. 18A, the optical shutter includes a fifth prism array 94. The fifth prism array 94 may be another example of the total internal reflection angle controlling medium 30 of FIG. 1. The fifth prism array 94 includes a fourth substrate 94A and a plurality of microprisms 94B. The fourth substrate 94A may be parallel with an image sensor 42. However, the image sensor 42 may be disposed in such a manner that incident light 46T from the fifth prism array 94 may be perpendicularly incident on the image sensor 42, and in this case, the image sensor 42 may not be parallel with the fourth substrate 94A. The plurality of microprisms 94B are arranged on a light-incident surface of the fourth substrate 94A. A process for forming the plurality of microprisms 94B on the light-incident surface of the fourth substrate 94A may be substantially the same as a process for forming the first prism array 60 of FIG. 10A. Each microprism 94B may be substantially the same as the second prism 46 of FIG. 3 except in terms of size. Thus, a procedure in which incident light 46L passes through the plurality of microprisms 94B, and thus is changed to refracted light 46T or is totally reflected may be substantially the same as a procedure described with reference to the second prism 46 of FIG. 3.

The fourth substrate 94A is a substrate that is transparent with respect to the incident light 46L. The fourth substrate 94A is formed of a material having substantially the same electro-optical characteristic as the plurality of microprisms 94B, and a refractive index of the material may be similarly changed to the plurality of microprisms 94B by an external action, e.g., by an intensity of an electric field 46E when the electric field 46E is applied to the optical shutter shown in FIG. 18A. FIG. 18B is a plane view of the fifth prism array 94.

Figure 19:
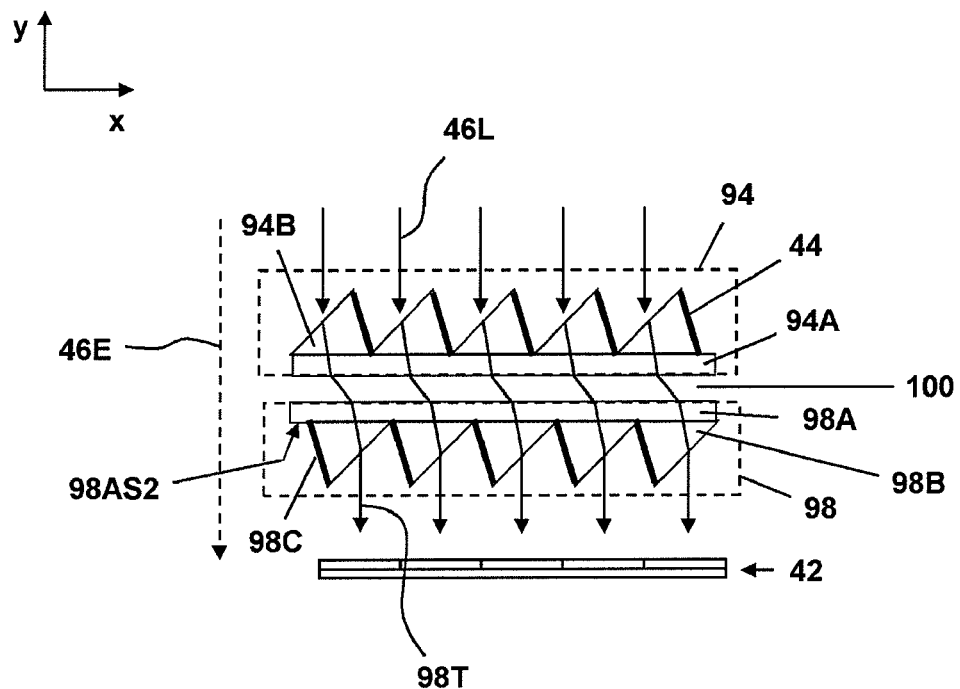
FIG. 19 is a diagram of an optical shutter including a prism array formed of a plurality of microprisms according to another exemplary embodiment.

FIG. 19 is a diagram of an optical shutter including a prism array formed of a plurality of microprisms according to another exemplary embodiment.

Referring to FIG. 19, the optical shutter of FIG. 19 corresponds to a case in which a sixth prism array 98 is further arranged between the image sensor 42 and the fifth prism array 94 of the optical shutter of FIG. 18A. The sixth prism array 98 may be another example of a light path changing unit. Thus, instead of the sixth prism array 98, another light path changing unit performing substantially the same function may be arranged. The sixth prism array 98 functions to change a path of light 46T shown in FIG. 18A so as to allow the light 46T shown in FIG. 18A to be perpendicular light 98T to the image sensor 42, wherein the light 46T travels from the fifth prism array 94 to the image sensor 42 in a shutter-on state. By arranging the sixth prism array 98, the image sensor 42 and the fifth prism array 94 may be positioned on the same vertical light axis in the optical shutter of FIG. 19. Accordingly, a horizontal size of the optical shutter may be reduced, and since light is perpendicularly incident on the image sensor 42, a light sensing efficiency of the image sensor 42 may be increased.

A gap 100 exists between the fifth prism array 94 and the sixth prism array 98. The gap 100 may be equal to or less than about 10 μm. A thickness of the gap 100 is uniform. The gap 100 may be filled with an optical medium having a given refractive index. The refractive index of the optical medium filling the gap 100 may be less then refractive indexes of the fifth and sixth prism arrays 94 and 98. The optical medium filling the gap 100 may be another material having a refractive index less than air or the fourth and fifth substrates 94A and 98A. Thus, light passing through the gap 100 is horizontally moved in a direction of a travel path of the light in proportion to the thickness of the gap 100. Thus, the thickness of the gap 100 may be appropriately determined in consideration of a position of the image sensor 42.

The sixth prism array 98 includes the fifth substrate 98A and a plurality of microprisms 98B. The fifth substrate 98A may be substantially the same electro-optical material as the fourth substrate 94A. Also, the fifth substrate 98A may have substantially the same thickness as the fourth substrate 94A. The fifth substrate 98A is parallel with the fourth substrate 94A, and the fifth substrate 98A and the fourth substrate 94A face each other. The gap 100 exists between the fifth substrate 98A and the fourth substrate 94A. An electro-optical characteristic of each microprism 98B may be the substantially same as each microprism 94B of the fifth prism array 94 except for their arranged directions. The plurality of microprisms 98B in the sixth prism array 98 are attached on a light-exit surface 98AS2 of the fifth substrate 98A.

Each microprism 98B corresponds to each microprism 94B of the fifth prism array 94. Each microprism 98B corresponds to a case in which each microprism 94B of the fifth prism array 94 rotates around a Y-axis by about 180 degrees and then rotates around an X-axis by about 180 degrees. A light absorbing unit 44 is arranged on a light-exit surface of each microprism 94B of the fifth prism array 94 via which a totally reflected light is emitted, and in this regard, a light absorbing unit 98C is arranged on a surface of each microprism 98B of the fifth substrate 98A, wherein the surface corresponds to the light-exit surface of each microprism 94B. Here, the light absorbing unit 98C is optional and thus may not be included. A travel path of incident light 46L is actually changed by the microprisms 94B and 98B, and shapes and electro-optical characteristics of the microprisms 94B and 98B are substantially the same as those of the second and fourth prisms 46 and 52 of FIG. 5. Thus, a travel path of the incident light 46L that is incident on the optical shutter of FIG. 19 in a shutter-on state, passes through the fifth and sixth prism arrays 94 and 98, and then is incident on the image sensor 42, may be substantially the same as a travel path of light (refer to FIG. 5) that passes through the second and fourth prisms 46 and 52 and then is incident on the image sensor 42.

The incident light 46L entering the optical shutter of the FIG. 18 is parallel light. However, non-parallel light such as spherical-wave light may be incident on the optical shutter. In this case, as illustrated in an optical shutter of FIG. 20, an incident-light path changing unit 110 may be arranged in front of the fifth prism array 94. The incident-light path changing unit 110 may be a Fresnel lens. The incident-light path changing unit 110 changes incident spherical-wave light 68L into the parallel light 46L.

Meanwhile, light incident on the optical shutter of FIG. 19 may be non-parallel light. In this case, as illustrated in an optical shutter of FIG. 21, an incident-light path changing unit 120 may be arranged in front of the fifth prism array 94. The incident-light path changing unit 120 of FIG. 21 may be substantially the same as the incident-light path changing unit 110 of FIG. 20.

Figure 20:
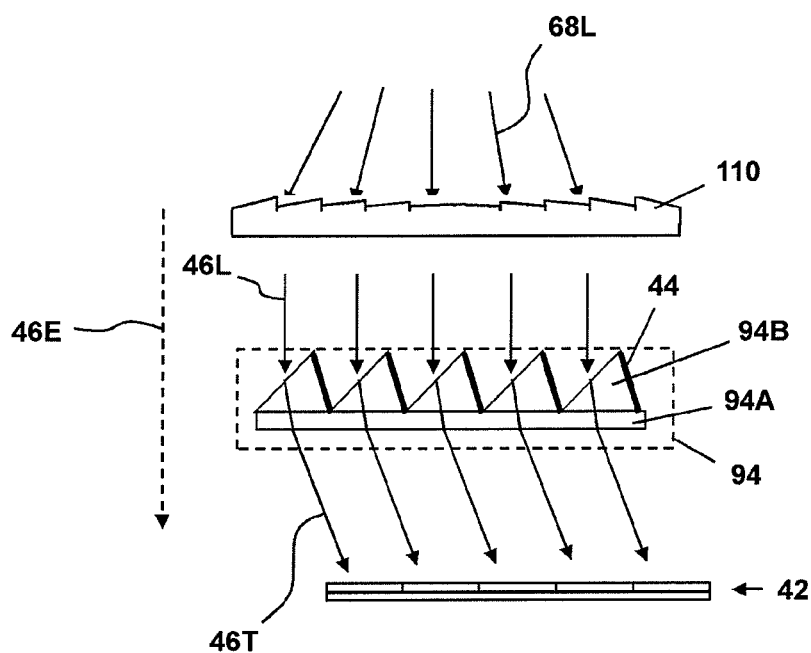
FIG. 20 is a cross-sectional view of the optical shutter of FIG. 18 further arranging an incident light path changing unit in front of a third prism array.
Figure 21:
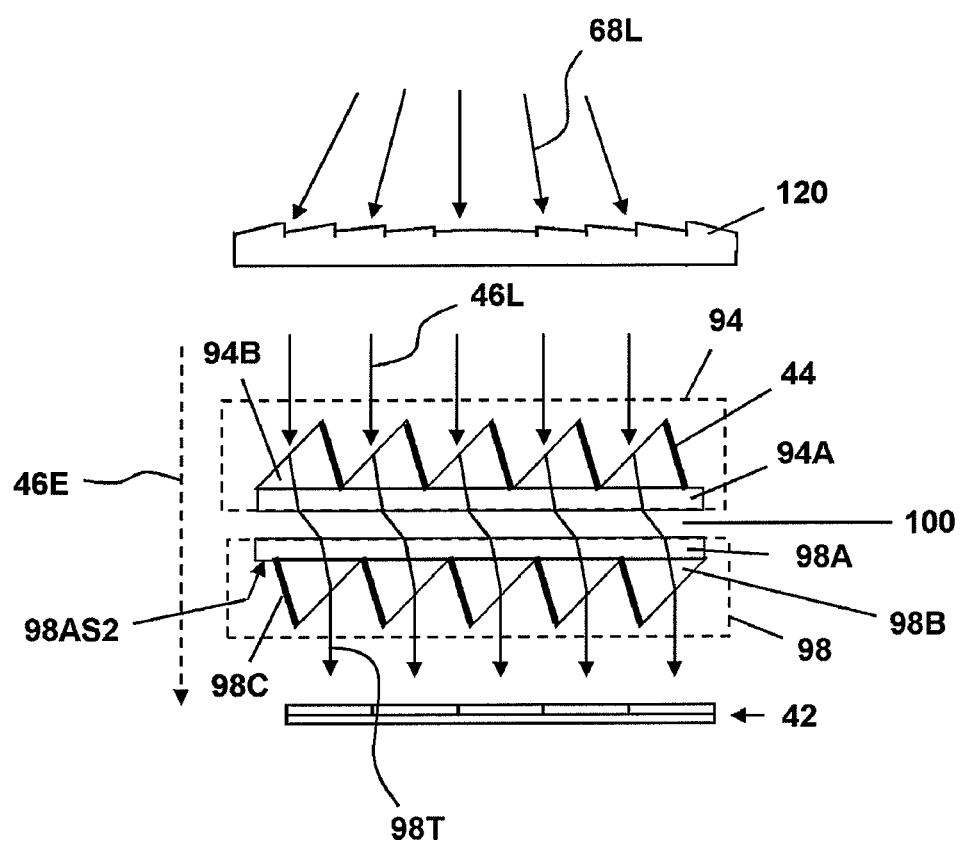
FIG. 21 is a cross-sectional view of the optical shutter of FIG. 19 further arranging an incident light path changing unit in front of a third prism array.

The incident-light path changing unit 110 and the incident-light path changing unit 120 in the optical shutters of FIGS. 20 and 21 may be arranged to directly contact the fifth prism array 94. However, a transparent plane plate having a uniform thickness may be further arranged between the fifth prism array 94 and incident-light path changing units 110 and 120.

Figure 22A:
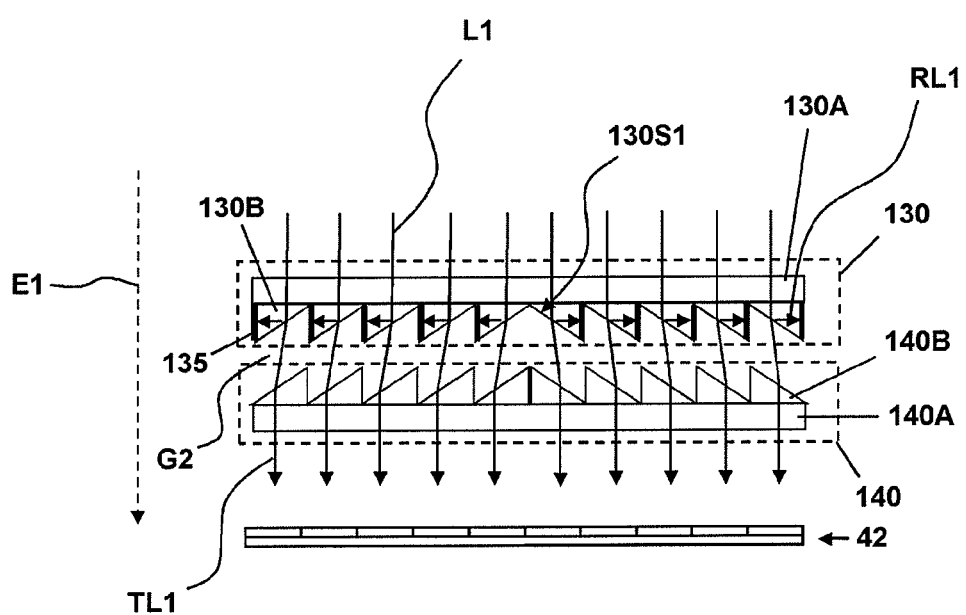
FIGS. 22A and 22B are diagrams of an optical shutter according to another exemplary embodiment.

FIG. 22A is a diagram of an optical shutter according to another exemplary embodiment.

Figure 23:
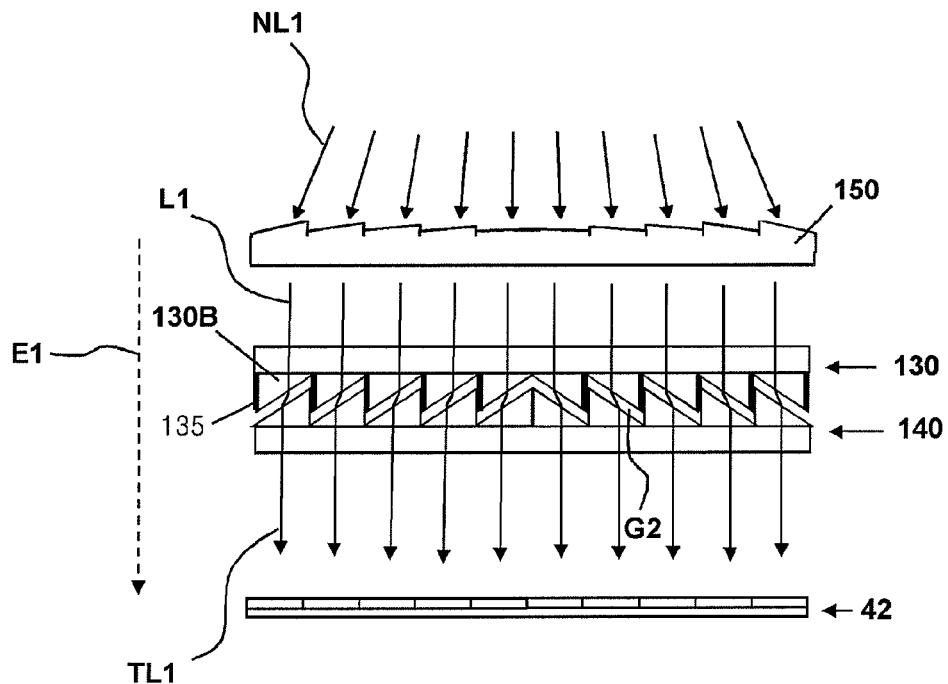
FIG. 23 is a cross-sectional view of the optical shutter of FIG. 22 further arranging an incident light path changing unit in front of a sixth prism array.

Referring to FIG. 22A, the optical shutter includes seventh and eighth prism arrays 130 and 140. The eighth prism array 140 and the seventh prism array 130 are sequentially arranged above the image sensor 42. The seventh and eighth prism arrays 130 and 140, and the image sensor 42 are arranged on the same optical axis. A gap G2 exists between the seventh and eighth prism arrays 130 and 140. In FIG. 22A, for convenience of illustration and description, the gap G2 is exaggerated. As illustrated in FIG. 23, the gap G2 actually exists between an inclined surface of a first annular microprism 130B and an inclined surface of a second annular microprism 140B. An interval of the gap G2 may be equal to or less than about 10 μm.

The seventh prism array 130 allows incident light L1 to propagate toward the eighth prism array 140 (a shutter-on state) or to block the propagation of the light L1 (a shutter-off state), according to an external action, e.g., according to an intensity of an applied electric field E1 or a level of an applied voltage. When the optical shutter is in the shutter-on state, the eighth prism array 140 functions to change a path of light from the seventh prism array 130, and then to allow the light to be perpendicularly incident on the image sensor 42. The seventh prism array 130 includes a sixth substrate 130A and a plurality of first annular microprisms 130B. The sixth substrate 130A may be formed of a material having substantially the same electro-optical characteristic as the plurality of first annular microprisms 130B, e.g., a transparent material whose refractive index is changed by the electric field E1. The sixth substrate 130A may be substantially the same as the first substrate 62 of FIG. 10A. The plurality of first annular microprisms 130B differ from each other in terms of size.

Figure 22B:
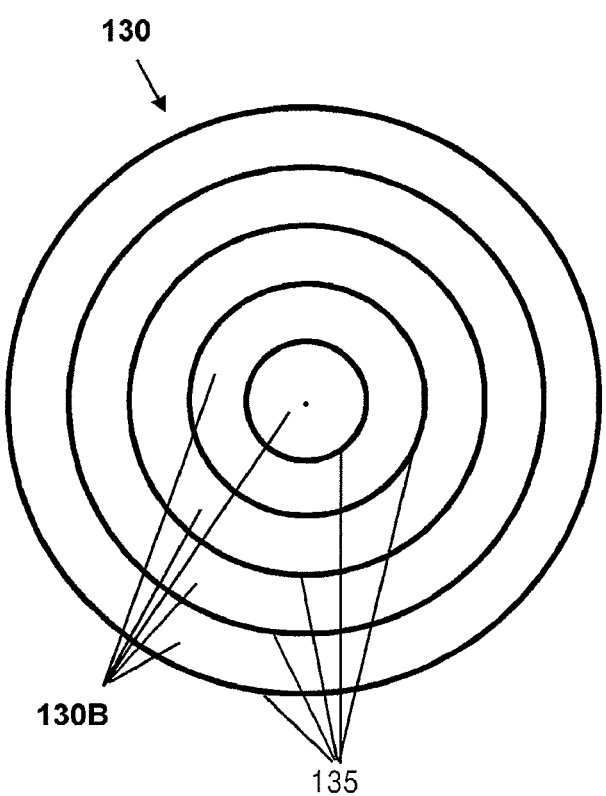

FIG. 22B is a bottom view of the seventh prism array 130.

Referring to FIG. 22B, an array of the plurality of first annular microprisms 130B is configured in such a manner that the first annular microprism 130B having the smallest diameter exists in a center of the array, and the first annular microprisms 130B surround the first annular microprism 130B having the smallest diameter in an order according to diameter size. As illustrated in FIG. 22A, a cross-sectional view of each first annular microprism 130B is substantially the same rectangular prism as the microprism 60A of the first prism array 60 of FIG. 10A. Thus, a path (for total internal reflection or refraction on a total internal reflection surface) of the incident light L1 that passes through the plurality of first annular microprisms 130B of the seventh prism array 130 may be substantially the same as the path described with reference to FIG. 2 or 10A. A light absorbing unit 135 is attached on a surface of each first annular microprism 130B on which light RL1 that is totally reflected from a total internal reflection surface 130S1 of each first annular microprism 130B of the seventh prism array 130 is incident thereon. The light absorbing unit 135 may be substantially the same as the light absorbing unit 44 described with reference to FIG. 2. The eighth prism array 140 includes a seventh substrate 140A and a plurality of second annular microprisms 140B.

The seventh substrate 140A may be a substrate having substantially the same electro-optical characteristic as the sixth substrate 130A. The sixth substrate 130A and the seventh substrate 140A may be parallel with each other and may have a uniform thickness. The second annular microprisms 140B function as a counterpart to the plurality of first annular microprisms 130B. A cross-section of each second annular microprism 140B is substantially the same as the microprism 64A of the second prism array 64 of FIG. 11. Thus, an arrangement relation between the plurality of first and second annular microprisms 130B and 140B may be substantially the same as an arrangement relation between the first and second prism arrays 60 and 64 in FIG. 11. Thus, the path of the incident light L1 that passes through the plurality of first and second annular microprisms 130B and 140B, and then is changed to light TL1 to be perpendicularly incident on the image sensor 42, is substantially the same as a path of incident light that passes through the microprisms 60A and 64A of the first and second prism arrays 60 and 64 in FIG. 11.

Meanwhile, in the case where light incident on the optical shutter of FIG. 22A is non-parallel light, an incident light path changing unit 150 may be arranged in front of the seventh prism array 130, as illustrated in FIG. 23. The incident light path changing unit 150 may be substantially the same as the previously described incident light path changing units 80, 90, 110, and 120. The incident light path changing unit 150 functions to change a path of non-parallel incident light NL1 and then to emit the non-parallel incident light NL1 as parallel light.

Figure 24A:
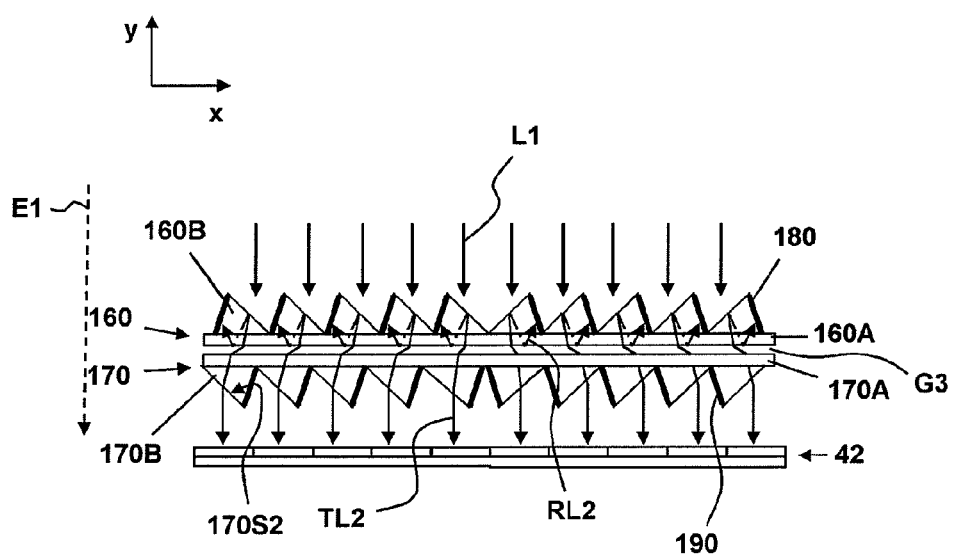
FIGS. 24A and 24B are diagrams of an optical shutter including a prism array formed of a plurality of microprisms according to another exemplary embodiment.

FIG. 24A is diagrams of an optical shutter including a prism array formed of a plurality of microprisms according to another exemplary embodiment.

Referring to FIG. 24A, the optical shutter includes ninth and tenth prism arrays 160 and 170. Incident light L1 enters the ninth prism array 160. The tenth prism array 170 is arranged between the ninth prism array 160 and the image sensor 42. The ninth and tenth prism arrays 160 and 170, and the image sensor 42 may be arranged on the same optical axis. The ninth prism array 160 functions to block or allow the incident light L1 according to an external action. The tenth prism array 170 is an example of a light path changing unit, and functions to change a path of light from the ninth prism array 160, and then to allow the light to be perpendicularly incident on the image sensor 42. The ninth and tenth prism arrays 160 and 170, and the image sensor 42 are arranged in parallel.

The ninth and tenth prism arrays 160 and 170 are separated from each other. Thus, a gap G3 exists between the ninth and tenth prism arrays 160 and 170. The gap G3 is filled with an optical material. Here, a refractive index of the optical material is less than refractive indexes of the ninth and tenth prism arrays 160 and 170. The optical material may be air or another type of material.

The ninth prism array 160 includes an eighth substrate 160A and a plurality of third annular microprisms 160B. The eighth substrate 160A may be formed of a material having substantially the same electro-optical characteristic as the plurality of third annular microprisms 160B. The eighth substrate 160A may be substantially the same as the first substrate 62 of FIG. 10A. The eighth substrate 160A may be parallel with the image sensor 42. The plurality of third annular microprisms 160B are attached on a light-incident surface of the eighth substrate 160A. The plurality of third annular microprisms 160B may be formed of an electro-optical material, a refractive index of which is changed according to an external action and thus its angle of total internal reflection is changed.

Figure 24B:
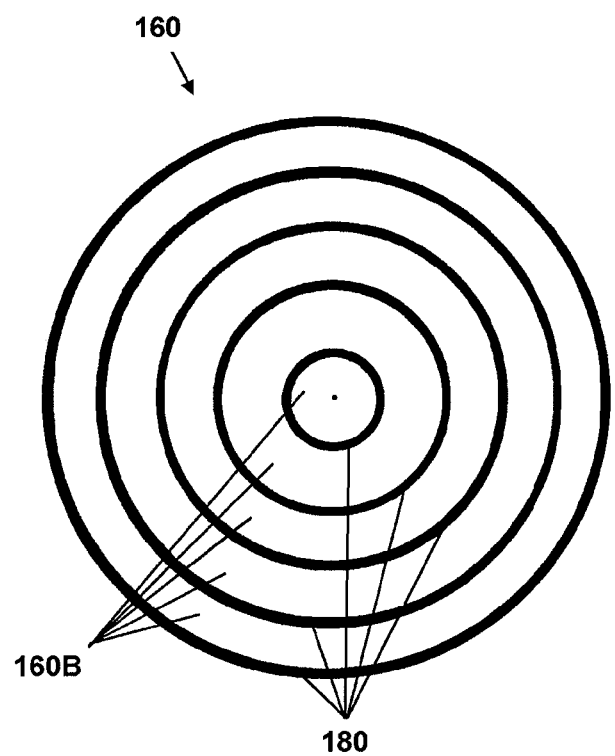

With respect to the arrangement of the plurality of third annular microprisms 160B, as illustrated in FIG. 24B, the third annular microprism 160B having the smallest diameter exists in a center, and the third annular microprisms 160B surround the third annular microprism 160B having the smallest diameter in an order according to diameter size. A light absorbing unit 180 is arranged on a surface of the third annular microprisms 160B via which light RL2 that is totally reflected from the eighth substrate 160A is emitted. The light absorbing unit 180 may be substantially the same as the previously described light absorbing unit 44.

The tenth prism array 170 includes a ninth substrate 170A and a plurality of fourth annular microprisms 170B. The ninth substrate 170A faces the eighth substrate 160A by having the gap G3 formed therebetween. The ninth substrate 170A may be parallel with the eighth substrate 160A and the image sensor 42. The ninth substrate 170A may have substantially the same electro-optical characteristic as the eighth substrate 160A. The ninth substrate 170A may have substantially the same electro-optical characteristic as the plurality of fourth annular microprisms 170B. Also, the ninth substrate 170A may be a substrate that does not have an electro-optical characteristic but is transparent and has a refractive index close to refractive indexes of the plurality of fourth annular microprisms 170B. The plurality of fourth annular microprisms 170B may be arranged to correspond to the plurality of third annular microprisms 160B or may be similarly arranged as the plurality of third annular microprisms 160B. The plurality of fourth annular microprisms 170B are attached on a light-exit surface of the ninth substrate 170A.

Referring to FIG. 24A, cross-sections of the third and fourth annular microprisms 160B and 170B are equal to the microprism 94B of the fifth prism array 94 and the microprism 98B of the sixth prism array 98 of FIG. 19, respectively. Also, in a shutter-on state, a travel path of the incident light L1 that passes through the plurality of third annular microprisms 160B and the plurality of fourth annular microprisms 170B may be substantially the same as a travel path of the incident light 46L that passes through the microprism 94B of the fifth prism array 94 and the microprism 98B of the sixth prism array 98 in the optical shutter of FIG. 19. Thus, in the shutter-on state, light TL2 that passes through the tenth prism array 170 and travels toward the image sensor 42 is perpendicularly incident on the image sensor 42. The cross-section of each fourth annular microprism 170B may correspond to a case in which each third annular microprism 160B rotates around a Y-axis by about 180 degrees and then rotates around an X-axis by about 180 degrees. A light absorbing unit 190 may be attached on a surface of each fourth annular microprism 170B, wherein the surface corresponds to a light-exit surface of each third annular microprism 160B via which the totally reflected light RL2 is emitted.

In the shutter-on state, light that is incident on the plurality of fourth annular microprisms 170B is refracted on a refraction surface 170S2, and then is incident on the image sensor 42. In this process, reflected light (not shown) may be generated on the refraction surface 170S2. The reflected light may interfere with the neighbouring fourth annular microprisms 170B. The light absorbing unit 190 absorbs the reflected light reflected from the refraction surface 170S2. Thus, by arranging the light absorbing unit 190, light interference between the plurality of fourth annular microprisms 170B may be prevented. In the case where the amount of reflected light is small, the light absorbing unit 190 may not be used.

Figure 25:
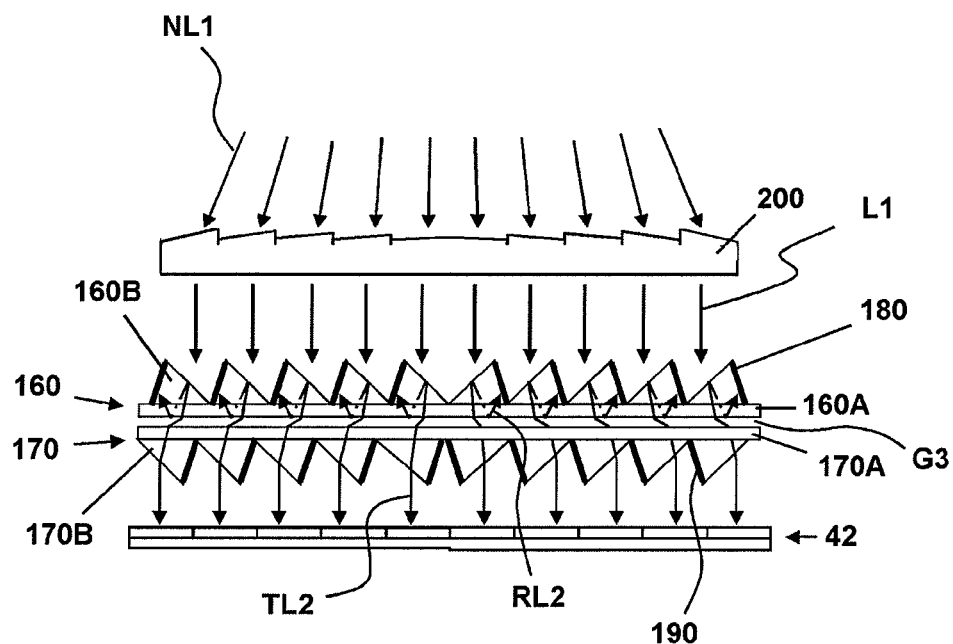
FIG. 25 is a cross-sectional view of the optical shutter of FIG. 24 further arranging an incident light path changing unit in front of an eighth prism array.

Meanwhile, in the case where the incident light L1 entering the optical shutter of the FIG. 24 is non-parallel light NL1, an incident light path changing unit 200 may be arranged in front of the ninth prism array 160, as illustrated in FIG. 25. The incident light path changing unit 200 may be a Fresnel lens. A travel path of the non-parallel light NL1 that is incident on the incident light path changing unit 200 is changed by passing through the incident light path changing unit 200, and then the non-parallel light NL1 is incident on the ninth prism array 160 as parallel-light L1.

Hereinafter, a simulation model with respect to the optical shutter by an exemplary embodiment as described the above will now be described, and an operational characteristic obtained from the simulation model will be examined.

Figure 26:
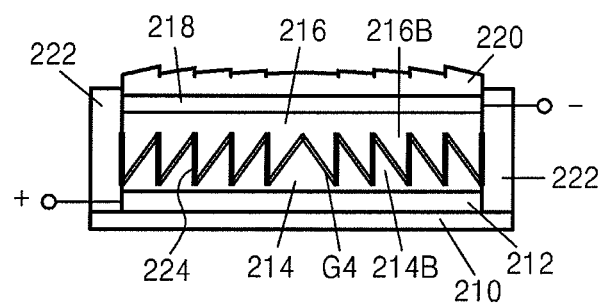
FIG. 26 is a diagram of a simulation model according to another exemplary embodiment.

FIG. 26 is a diagram of the simulation model according to another exemplary embodiment. The simulation model may be used in a camera optical system.

Referring to FIG. 26, a lower electrode 212, a lower prism array 214, an upper prism array 216, an upper electrode 218, and an incident light path changing unit 220 are sequentially stacked in the simulation model. The stacked elements may contact each other at interfaces therebetween. A CCD image sensor 210 is arranged below the lower electrode 212 of the simulation model. As a result, the stacked elements in the simulation model exist above the CCD image sensor 210. An adjusting frame 222 is arranged on side surfaces of the stacked elements including the lower electrode 212, the lower prism array 214, the upper prism array 216, and the upper electrode 218, and above the CCD image sensor 210. The adjusting frame 222 adjusts a distance between the upper and lower prism arrays 216 and 214. By using the adjusting frame 222, the gap G4 between facing inclined surfaces of microprisms 216B and 214B of the upper and lower prism arrays 216 and 214 may be adjusted to be less than about 10 μm. The upper prism array 216 includes a plurality of annular microprisms 216B whose cross-sections are rectangular. A light absorbing unit 224 is arranged on a vertical surface of each annular microprism 216B, that is, a surface via which light that is totally reflected from an inclined surface of each annular microprism 216B is emitted, wherein the inclined surface is a total internal reflection surface. The lower prism array 214 corresponds to a light path changing unit for changing a path of light incident from the upper prism array 216, and allows the light to be perpendicularly incident on the CCD image sensor 210. The lower prism array 214 is a counterpart to the upper prism array 216, and includes a plurality of annular microprisms 214B. The plurality of annular microprisms 214B of the lower prism array 214 are a counterpart to the plurality of annular microprisms 216B of the upper prism array 216. The plurality of annular microprisms 214B correspond to the plurality of annular microprisms 216B, respectively. The incident light path changing unit 220 may be a Fresnel lens. Materials of the upper and lower prism arrays 216 and 214 in the simulation model may be KTN. The upper and lower electrodes 218 and 212 are transparent electrodes, a voltage in the range of about 0V to about 250V may be applied between the upper and lower electrodes 218 and 212, and the voltage may be sequentially changed. A horizontal width of the simulation model is about 1 cm, and a whole height of the upper and lower prism arrays 216 and 214 is about 10 μm. A whole thickness of the simulation model is about 1 mm.

Figure 27:
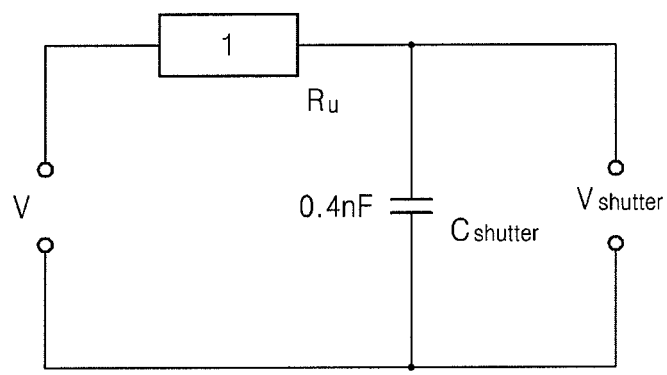
FIG. 27 is a diagram of an equivalent circuit with respect to the simulation model of FIG. 26.

FIG. 27 is a diagram of an equivalent circuit with respect to the simulation model of FIG. 26. In FIG. 27, $V_{shutter}$ indicates a voltage to be applied to the upper and lower prism arrays 216 and 214 of FIG. 26. $C_{shutter}$ indicates a capacitance of the upper and lower prism arrays 216 and 214. $R_u$ indicates a load resistance. Also, V indicates a voltage to be applied to an optical apparatus including the optical shutter of FIG. 26.

Figure 28:
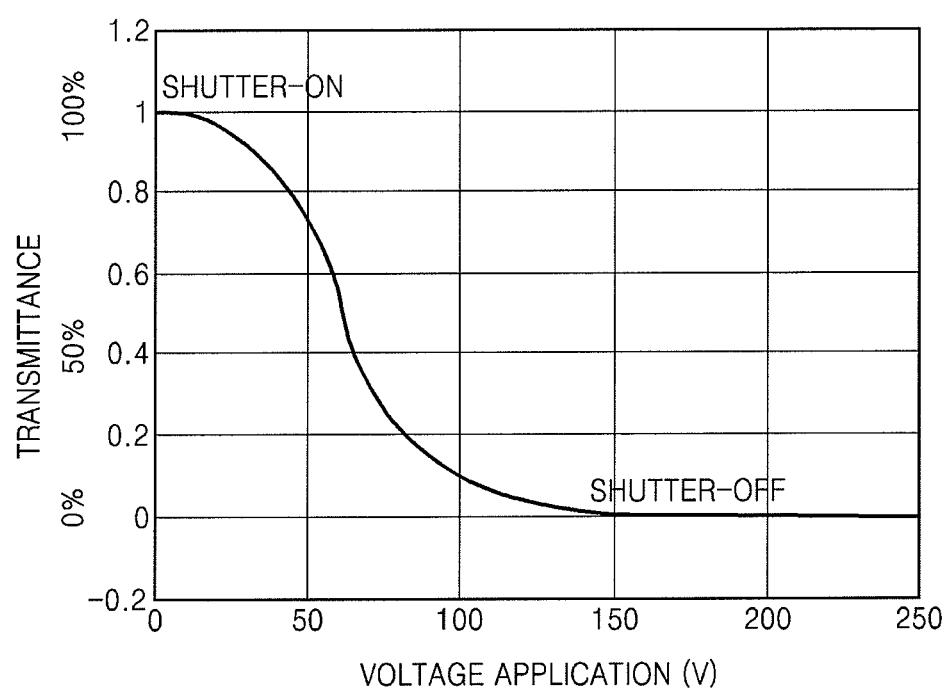
FIG. 28 is a graph for showing a relation between voltage application and transmittance with respect to the simulation model of FIG. 26.

FIG. 28 is a graph for showing a relation between voltage and transmittance with respect to the simulation model of FIG. 26. In FIG. 28, a horizontal axis indicates a voltage that is applied to the upper and lower prism arrays 216 and 214 via the upper and lower electrodes 218 and 212 in the simulation model. Also, a vertical axis indicates the transmittance of the upper and lower prism arrays 216 and 214 according to the voltage application.

A fixed angle of total internal reflection of each annular microprism 216B in the upper prism array 216 formed of the KTN material is about 26 degrees. The upper prism array 216 is regarded as formed in such a manner that an angle of total internal reflection of the upper prism array 216 is decreased according to an external action, that is, the voltage application. An incident angle of image light that is incident on the inclined surface, that is, the total internal reflection surface of each annular microprism 216B of the upper prism array 216 is constantly maintained to be less than about 26 degrees and to be greater than a minimum angle of total internal reflection that may be obtained according to the voltage application. For example, in the case where the minimum angle of total internal reflection is about 24 degrees, the incident angle of image light may be maintained at about 25 degrees.

Referring to FIG. 28, when the voltage application is about 0 (when an intensity of an applied electric field is about 0), the transmittance of the simulation model is about 100%. Thus, the simulation model becomes a shutter-on state. As the voltage application increases (the intensity of the applied electric field increases), the transmittance of the simulation model is about 0%. That is, as the voltage increases, the angle of total internal reflection of the upper prism array 216 is decreased from 26 degrees that is the fixed angle of total internal reflection and becomes smaller than the incident angle of the image light. Accordingly, the image light incident on the upper prism array 216 is totally reflected. Eventually, the simulation model becomes a shutter-off state. In FIG. 28, the transmittance varies according to the voltage application. According to such a result, by sequentially changing the voltage application within a given range of the voltage application, the transmittance may be sequentially controlled.

Meanwhile, if the upper prism array 216 is formed in such a manner that the angle of total internal reflection of the upper prism array 216 becomes larger due to the external action, that is, the voltage application, an affect relative to the voltage application is inverse to the aforementioned description in relation to FIG. 28. That is, when the voltage application is about 0, the simulation model becomes the shutter-off state, and as the voltage application increases, the simulation model becomes the shutter-on state.

Figure 29:
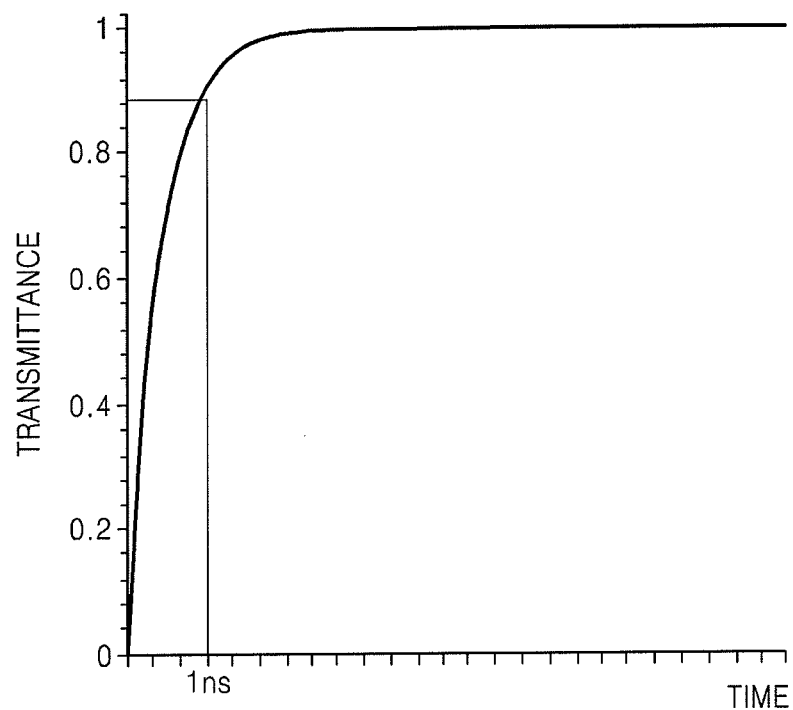
FIG. 29 is a graph for showing a time response, that is, a rising time with respect to voltage application when a voltage is applied to the simulation model.

FIG. 29 is a graph for showing a time response with respect to voltage application, that is, a shuttering state changing speed when a voltage is applied to the simulation model.

Referring to FIG. 29, after the voltage is applied, transmittance becomes larger by about 80% within 1 ns. This result means that it takes only about 1 ns so as to change the simulation model in the shutter-off state into the shutter-on state. Since this shuttering state change is reversible, the result of FIG. 29 means that it takes only about 1 ns so as to change the simulation model in the shutter-on state into the shutter-off state. A shutter speed of about 1 ns is extremely fast, compared to an image processing high speed shutter according to the related art. Thus, it is possible to rapidly transform or modulate an image.

FIGS. 30 through 35 are graphs for showing shutter speeds according to types of a voltage applied to the simulation model.

Figure 30:
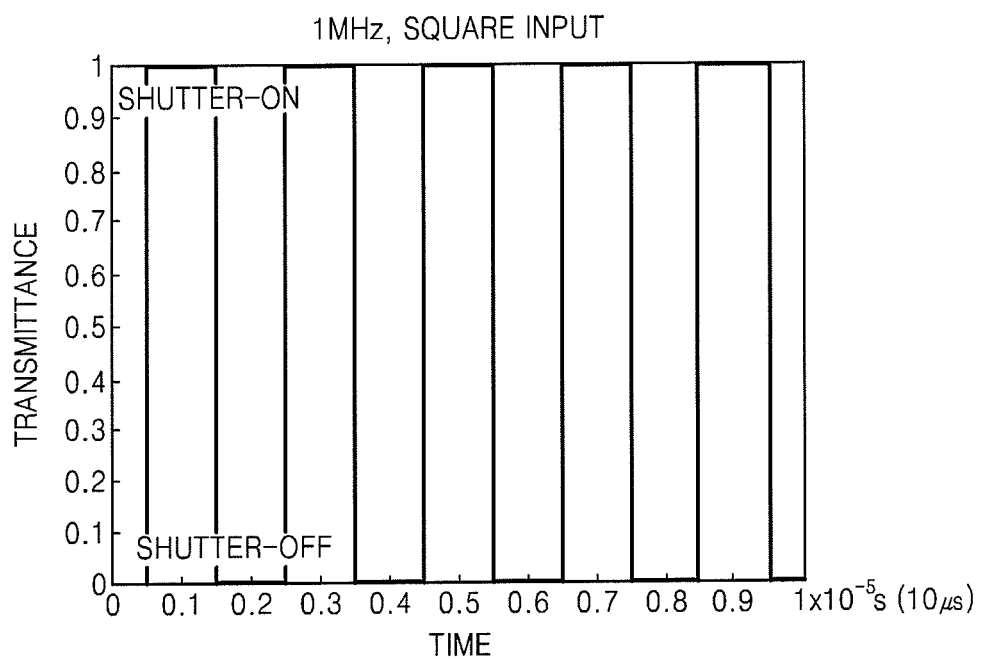
FIGS. 30 through 35 are graphs for showing shutter speeds according to types of a voltage applied to the simulation model.
Figure 31:
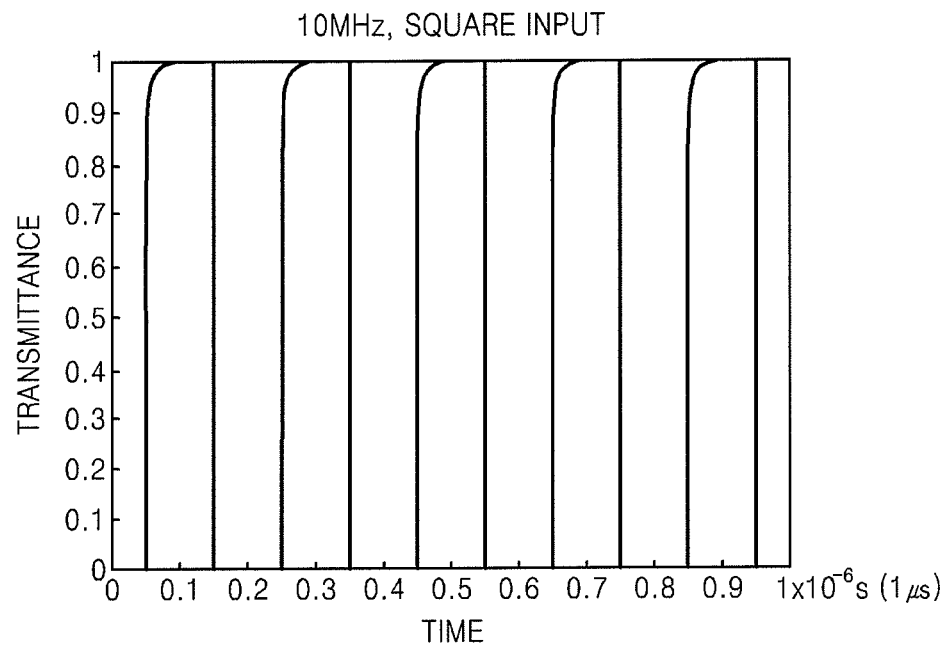
Figure 32:
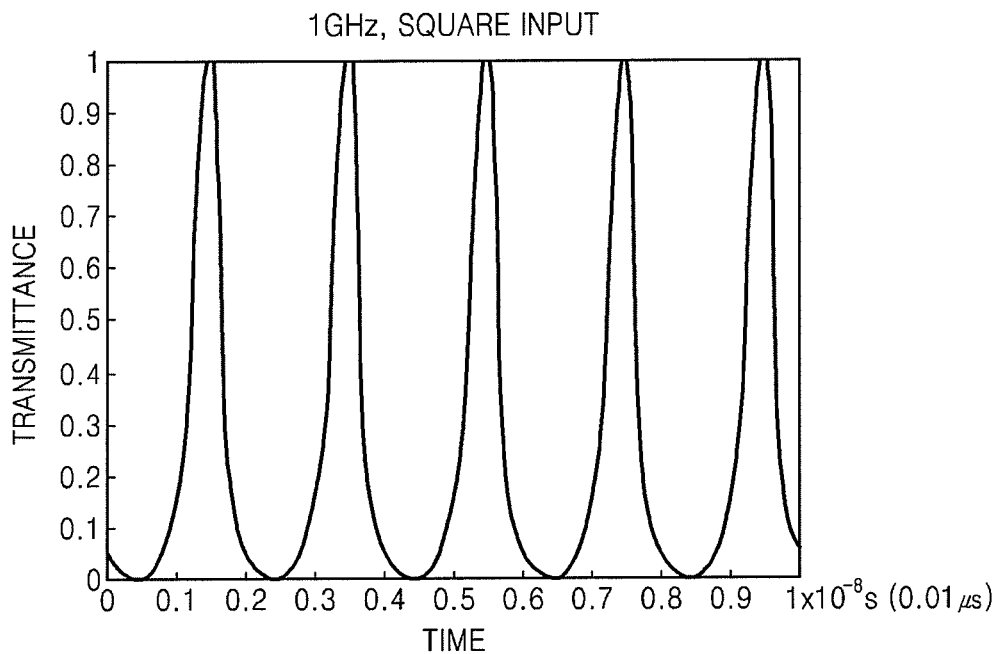
Figure 33:
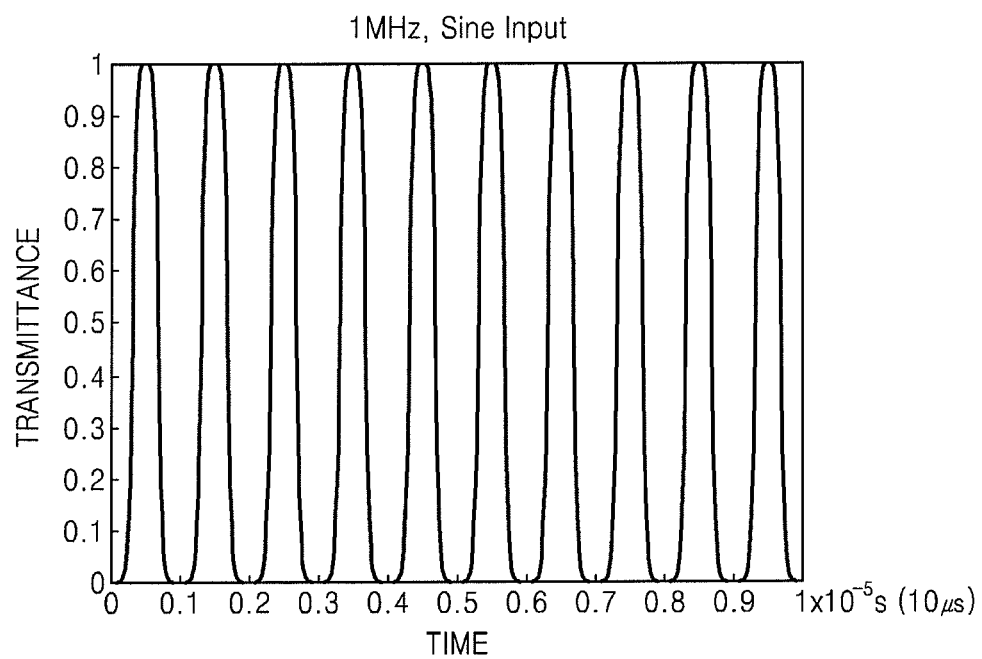
Figure 34:
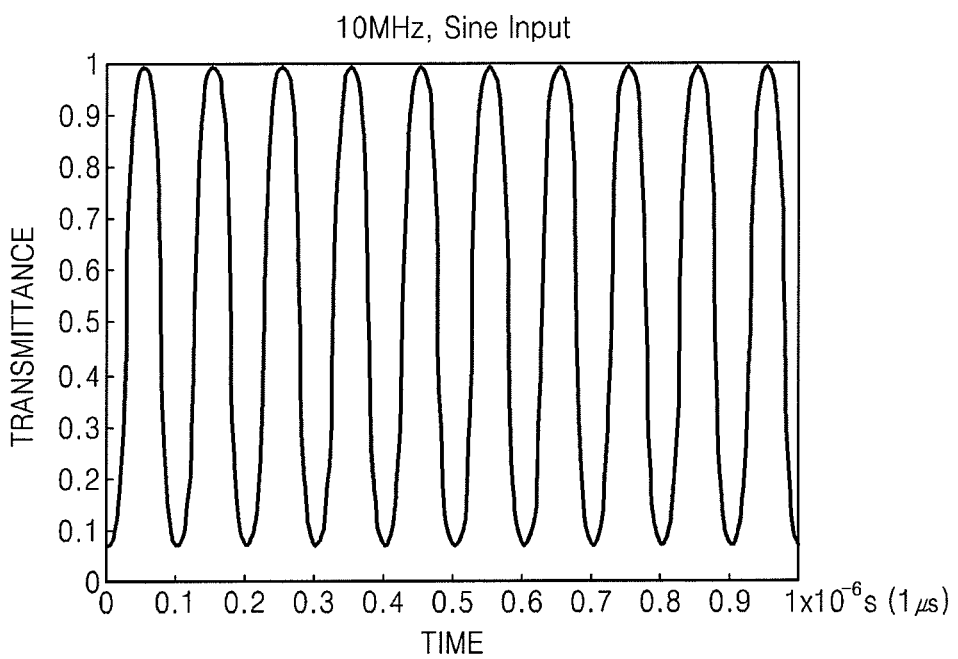
Figure 35:
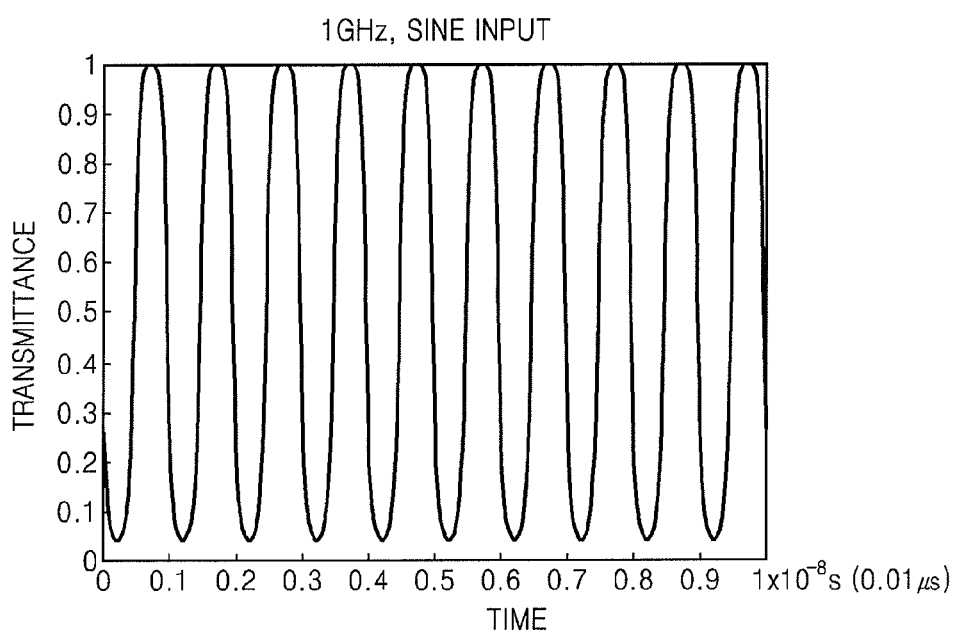

FIGS. 30 through 32 show a transmittance change when a waveform of the applied voltage is a square-wave. FIGS. 33 through 35 show a transmittance change when the waveform of the applied voltage is a sinusoidal-wave. The waveform of the voltage is not limited to the square-wave or the sinusoidal-wave.

Referring to FIGS. 30 through 32, when the applied voltage is the square-wave, the transmittance change is stable up to about 10 MHz, and distortion appears in the transmittance change at 1 GHz. Referring to FIGS. 33 through 35, the transmittance change is stable up to about 1 GHz when the applied voltage is the sinusoidal-wave.

Figure 36:
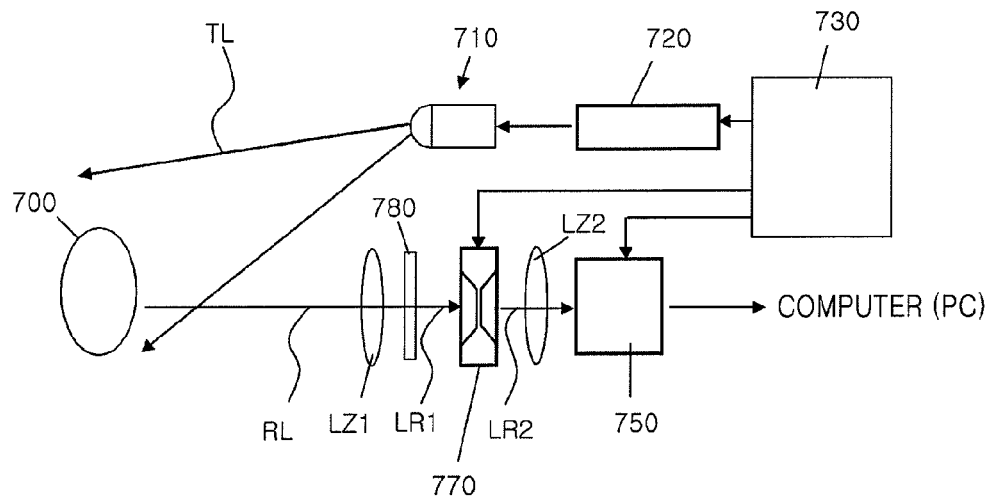
FIG. 36 is a diagram of an optical apparatus including the optical shutter according to an exemplary embodiment.

FIG. 36 is a diagram of an optical apparatus including the optical shutter according to another exemplary embodiment, and the optical apparatus may be a camera system for measuring a distance.

Referring to FIG. 36, the optical apparatus includes a light source 710, a light source driver 720, a camera controller 730, an optical image sensor 750, first and second lenses LZ1 and LZ2, a filter 780, and an optical shutter 770. The first lens LZ1, the filter 780, the optical shutter 770, the second lens LZ2, and the optical image sensor 750 may be aligned in a single direction, and may exist on the same optical axis. Irradiated light TL from the light source 710 is emitted toward a subject 700. Here, the irradiated light TL may be light having a particular wavelength, e.g., an infrared ray. The irradiated light TL may be irradiated in the form of a pulse-wave or a sinusoidal-wave. The light source 710 is controlled by the light source driver 720. An operation of the light source driver 720 is controlled by the camera controller 730. The camera controller 730 controls operations of the optical shutter 770 and the optical image sensor 750. The optical image sensor 750 may be a CCD or a CMOS. The first lens LZ1 collects reflected light RL from the subject 700 so that the reflected light RL may be appropriate to be incident on the filter 780. The filter 780 is a band-pass filter for removing noise light other than the irradiated light TL, and may be an IR band-pass filter. The second lens LZ2 functions to focus light emitted from the optical shutter 770 onto the optical image sensor 750. The optical shutter 770 may be one of optical shutters by the aforementioned exemplary embodiments.

The optical shutters according to the one or more exemplary embodiments may be applied to a 3D camera, laser radar (LADAR) technology, a display apparatus including a liquid crystal display (LCD) device, and other devices demanding an optical device for rapidly controlling transmittance and blocking of incident light.

By using the optical shutter according to the one or more exemplary embodiments, it is possible to use an electro-optical effect of a solid electro-optical material so that durability of the optical shutter may be robust.

Also, the optical shutter may be operated at a rapid shutter speed of about 1 ns so that an image may be rapidly processed.

In addition, the optical shutter may be manufactured as a thin plate so that the optical shutter may be minimized. Since the optical shutter has a structure which is formed by growing a material as the thin plate via crystal-growth and then micromachining, material costs and manufacturing costs may be reduced.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

What is claimed is:

1. An optical shutter comprising:
   an electro-optical medium, the electro-optical medium being transparent and in an active solid state,
   wherein the electro-optical medium comprises a total internal reflection surface at which an angle of incidence above which total internal reflection occurs is changeable in response to an input.

2. The optical shutter of claim 1, further comprising a first light path changing unit which changes a path of light passing through the electro-optical medium to be perpendicularly incident on a target object.

3. The optical shutter of claim 2, further comprising a second light path changing unit disposed in front of the electro-optical medium.

4. The optical shutter of claim 2, wherein the electro-optical medium comprises a first prism or a first prism array, and the first light path changing unit comprises a second prism or a second prism array.

5. The optical shutter of claim 4, wherein the electro-optical medium comprises the first prism, the first light path changing unit comprises the second prism and a shape of the first prism of the electro-optical medium and a shape of the second prism of the first light path changing unit are substantially same, and are disposed to be symmetrical with each other.

6. The optical shutter of claim 4, wherein the electro-optical medium comprises the first prism array, the first prism array comprising a first plurality of microprisms, the first light path changing unit comprises the second prism array, the second prism array comprising a second plurality of microprisms, and a cross-sections of the first plurality of microprisms of the electro-optical medium are symmetrical with cross-sections of the second plurality of microprisms of the first light path changing unit.

7. The optical shutter of claim 6, wherein the first and the second plurality of microprisms are annular microprisms.

8. The optical shutter of claim 3, wherein the second light path changing unit comprises a lens unit which transmits light incident on the second light path changing unit, to the electro-optical medium as parallel light.

9. The optical shutter of claim 4, wherein a gap having a uniform thickness is between the electro-optical medium and the first light path changing unit on the path of light.

10. The optical shutter of claim 4, wherein a light absorbing film is attached on one surface of the first prism of the electro-optical medium or on one surface of the first prism array of the electro-optical medium, and the one surface of the first prism or the first prism array is a surface on which totally reflected incident light is incident thereon.

11. The optical shutter of claim 9, wherein the gap comprises an optical medium comprising a refractive index that is less than air, the first and the second prisms, or the first and the second prism arrays.

12. The optical shutter of claim 1, further comprising an incident light path changing unit disposed in front of the electro-optical medium.

13. The optical shutter of claim 12, wherein the incident light path changing unit comprises a prism or a prism array.

14. The optical shutter of claim 12, wherein the incident light path changing unit is a lens unit for changing a shape of incident light entering the incident light path changing unit so the incident light is incident on the electro-optical medium as parallel light.

15. The optical shutter of claim 1, wherein the electro-optical medium is a prism or a prism array through which incident light is totally reflected or transmitted based on the input.

16. The optical shutter of claim 15, wherein a light-incident surface of the prism, or a light-incident surface of the prism array is inclined with respect to the incident light.

17. The optical shutter of claim 13, wherein the prism array comprises a plurality of microprisms in a stripe form, or a plurality of annular microprisms.

18. The optical shutter of claim 1, wherein the input is an electric field formed by applying a voltage.

19. The optical shutter of claim 15, wherein a light absorbing film is disposed at one surface of the prism or at one surface of the prism array, and the one surface of the prism or the prism array is a surface on which totally reflected incident light is incident thereon.

20. The optical shutter of claim 16, wherein a light absorbing film is disposed at a surface of the prism or at a surface of the prism array of the light path changing unit, wherein the surface of the prism or the prism array is not in a path of light.

21. The optical shutter of claim 1, wherein the electro-optical medium is inclined with respect to an object on which light emitted from the electro-optical medium is incident thereon.

22. A camera comprising an optical shutter, wherein the optical shutter comprises the optical shutter of claim 1.

23. A camera comprising an optical shutter, wherein the optical shutter comprises the optical shutter of claim 2.

24. The camera of claim 23, further comprising a second light path changing unit disposed in front of the electro-optical medium.

25. The camera of claim 23, wherein the electro-optical medium comprises a first prism or a first prism array and the first light path changing unit comprises a second prism or a second prism array.

26. A display apparatus comprising an optical shutter, wherein the optical shutter comprises the optical shutter of claim 1.

27. A display apparatus comprising an optical shutter, wherein the optical shutter comprises the optical shutter of claim 2.

28. The display apparatus of claim 26, further comprising an incident light path changing unit disposed in front of the electro-optical medium.

29. The display apparatus of claim 27, further comprising a second light path changing unit disposed in front of the electro-optical medium.

30. The display apparatus of claim 27, wherein the electro-optical medium comprises a first prism or a first prism array and the first light path changing unit comprises a second prism or a second prism array.

31. A method of operating an optical shutter including an electro-optical medium, the electro-optical medium being transparent and in an active solid state, and wherein the electro-optical medium includes a total internal reflection surface at which an angle of incidence above which total internal reflection occurs is changeable in response to an input, the method comprising changing the angle of incidence above which total internal reflection occurs by applying a voltage to the electro-optical medium.

32. The method of claim 31, further comprising sequentially changing the angle of total internal reflection of the electro-optical medium by sequentially applying the voltage to the electro-optical medium.

33. The method of claim 31, wherein the angle of total internal reflection of the electro-optical medium is decreased by applying the voltage.

34. The method of claim 31, wherein the angle of total internal reflection of the electro-optical medium is increased by applying the voltage.

35. The method of claim 31, wherein an incident angle of light incident on the electro-optical medium is less than a fixed angle of total internal reflection of the electro-optical medium, and is greater than a minimum angle of total internal reflection formed by applying the voltage.

36. The method of claim 31, wherein an incident angle of light incident on the electro-optical medium is greater than a fixed angle of total internal reflection of the electro-optical medium, and is less than a maximum angle of total internal reflection formed by applying the voltage.

37. An optical apparatus comprising:
a refractive element having one of at least two indices of refraction, the refractive element having one of the at least two indices of refraction when a first input is received and another of the least two indices of refraction when a second input is received; and an image sensor which is operable to receive light refracted and transmitted by the refractive element, wherein, in response to the first input being received, an angle of incidence above which total internal reflection occurs at the refractive element is changed to a first angle and the refractive element refracts light toward the image sensor, and wherein, in response to the second input being received, the angle of incidence above which total internal reflection occurs at the refractive element is changed to a second angle and the refractive element reflects light away from the image sensor.

38. The optical apparatus of claim 37, wherein the refractive element comprises a light input surface and a light output surface, and wherein one of the light input surface and the light output surface of the refractive element is inclined and not perpendicular with respect to the light received by the refractive element.

39. The optical apparatus of claim 38 further comprising a collimating unit which collimates light and outputs the collimated light to the refractive element.

* * * * *